US012350217B2

(12) United States Patent
Behrendt

(10) Patent No.: US 12,350,217 B2
(45) Date of Patent: Jul. 8, 2025

(54) CHAIR, PRESSING DEVICE

(71) Applicant: Christian Behrendt, Freilassing (DE)

(72) Inventor: Christian Behrendt, Freilassing (DE)

( * ) Notice: Subject to any disclaimer, the term of this patent is extended or adjusted under 35 U.S.C. 154(b) by 921 days.

(21) Appl. No.: 17/427,145

(22) PCT Filed: Jan. 30, 2020

(86) PCT No.: PCT/EP2020/052349
§ 371 (c)(1),
(2) Date: Jul. 30, 2021

(87) PCT Pub. No.: WO2020/157232
PCT Pub. Date: Aug. 6, 2020

(65) Prior Publication Data

US 2022/0183918 A1 Jun. 16, 2022

(30) Foreign Application Priority Data

Jan. 30, 2019 (DE) ..................... 10 2019 102 375.0

(51) Int. Cl.
*A61H 1/02* (2006.01)
*A61H 39/04* (2006.01)

(52) U.S. Cl.
CPC ........... *A61H 1/0244* (2013.01); *A61H 1/024* (2013.01); *A61H 1/0266* (2013.01);
(Continued)

(58) Field of Classification Search
CPC .... A61H 2201/0149; A61H 2201/1676; A61H 2201/1695; A61H 1/001–005;
(Continued)

(56) References Cited

U.S. PATENT DOCUMENTS

| | | | |
|---|---|---|---|
| 454,100 | A | 6/1891 | Wilson |
| 3,220,771 | A | 11/1965 | Doss |

(Continued)

FOREIGN PATENT DOCUMENTS

| | | | |
|---|---|---|---|
| CN | 106667716 | A | 5/2017 |
| CN | 206566171 | U | 10/2017 |

(Continued)

OTHER PUBLICATIONS

Japanese Office Action dated Nov. 15, 2023 for corresponding application No. JP2021-543538.

(Continued)

*Primary Examiner* — Rachel T Sippel
*Assistant Examiner* — Gwynneth L Howell
(74) *Attorney, Agent, or Firm* — Bachman & LaPointe, P.C.

(57) ABSTRACT

The invention relates to a chair for accommodating a person. The chair includes an upper body section having an upper body contact surface adapted or adaptable to at least parts of a front of a torso or a rear of a torso of a person placed on the chair, and a lower body section having a lower body contact surface adapted or adaptable to at least parts of at least a front of a thigh of the person, wherein the upper body section and the lower body section are arranged or arrangeable and fixable in a position relative to each other such that the upper body contact surface and the lower body contact surface cause a hyperextension posture of the hip joint of the person with a predetermined hyperextension angle. By forming the hyperextension angle of the hip on the chair, shortening of the anterior thigh and hip muscles can be counteracted. Also disclosed are a pressing device for application to the human body, (Continued)

which is adapted for use on a chair and which includes one or more pressure units each having at least one pressure head adapted to apply local or point pressure at a predetermined pressure location on the body of a person accommodated on the chair, and a chair having such a pressing device.

14 Claims, 26 Drawing Sheets

(52) U.S. Cl.
CPC ........... *A61H 1/0296* (2013.01); *A61H 39/04* (2013.01); *A61H 2201/0134* (2013.01); *A61H 2201/0149* (2013.01); *A61H 2201/0192* (2013.01); *A61H 2201/1284* (2013.01); *A61H 2201/1676* (2013.01); *A61H 2201/1685* (2013.01); *A61H 2201/1695* (2013.01); *A61H 2201/5053* (2013.01); *A61H 2201/5061* (2013.01); *A61H 2203/0431* (2013.01); *A61H 2203/0468* (2013.01)

(58) Field of Classification Search
CPC ........ A61H 1/02; A61H 1/0244; A61H 1/024; A61H 1/0266; A61H 1/0296; A61H 1/0237; A61H 39/04; A61H 2203/0468; A47C 1/022; A47C 9/002; A47C 9/005; A47C 9/025; A47C 9/024; A47C 15/00; A63B 2210/02; A63B 2023/006; A63B 23/0482
USPC ............ 601/23, 24, 134, 237; 606/240, 241; 482/56, 62, 142; 602/32
See application file for complete search history.

(56) References Cited

U.S. PATENT DOCUMENTS

| | | | | |
|---|---|---|---|---|
| 3,754,787 | A | 8/1973 | Garber | |
| 4,662,361 | A | 5/1987 | Patterson | |
| 4,832,407 | A | 5/1989 | Serber | |
| 5,295,728 | A | 3/1994 | Schaevitz | |
| 5,393,280 | A * | 2/1995 | Haviv | A63B 69/10 482/56 |
| 5,971,485 | A | 10/1999 | Clark | |
| 6,287,243 | B1 | 9/2001 | Isom et al. | |
| 6,764,432 | B2 * | 7/2004 | Hippensteel | A63B 22/0005 482/142 |
| 7,648,473 | B1 | 1/2010 | Peruvingal | |
| 7,946,972 | B2 * | 5/2011 | Guissin | A47C 7/405 482/142 |
| 9,827,162 | B1 * | 11/2017 | Vidmar | A47C 7/006 |
| 10,966,892 | B2 * | 4/2021 | Lim | A61G 13/125 |
| 10,973,725 | B2 * | 4/2021 | Mason | A47C 7/024 |
| 2007/0052275 | A1 * | 3/2007 | Ghilzai | A47C 1/11 297/423.12 |
| 2007/0290538 | A1 * | 12/2007 | Walter | A47C 9/002 297/316 |
| 2010/0064440 | A1 | 3/2010 | Finlay et al. | |
| 2016/0354627 | A1 * | 12/2016 | Cygan | A63B 23/03508 |
| 2017/0259110 | A1 * | 9/2017 | Lomangino | A63B 23/025 |

FOREIGN PATENT DOCUMENTS

| | | | |
|---|---|---|---|
| DE | 2117330 | A1 | 10/1972 |
| DE | 4435308 | A1 | 4/1996 |
| DE | 202009005763 | U1 | 7/2010 |
| EP | 0163437 | A | 12/1985 |
| EP | 2777434 | A1 | 9/2014 |
| JP | 55-175454 | U | 12/1980 |
| JP | 57-045925 | U | 3/1982 |
| JP | 62-152483 | A | 7/1987 |
| JP | H11197270 | A | 7/1999 |
| JP | 2005118749 | A | 5/2005 |
| JP | 2005130885 | A | 5/2005 |
| JP | 3114387 | U | 10/2005 |
| JP | 2006288784 | A | 10/2006 |
| JP | 2018126281 | A | 8/2018 |
| KR | 20090012461 | U | 12/2009 |
| WO | 2013003369 | A2 | 1/2013 |
| WO | 2017179034 | A1 | 10/2017 |
| WO | 2017205923 | A1 | 12/2017 |

OTHER PUBLICATIONS

Office Action dated Feb. 17, 2023 for corresponding European Application No. 20703013.1.
Esposito et al., Time course of stretching-induced changes in mechanomyogram and force characteristics, Journal of Electromyography and Kinesiology, vol. 21, (2011), pp. 795-802.
Latorre et al., Active superelasticity in three-dimensional epithelia of controlled shape. Nature (2018), vol. 563, pp. 203-208. https://doi.org/10.1038/s41586-018-0671-4.
International search report for patent application No. PCT/EP2020/052349 dated Apr. 30, 2020.

* cited by examiner

CHAIR, PRESSING DEVICE

BACKGROUND OF THE INVENTION

The present invention relates to a chair for accommodating a person and to a pressing device for applying a local or punctual pressure at one or more pressure locations on the human body.

Chairs are conventionally designed to accommodate a human body in a seated position with a back resting against a backrest and the backs of the thighs resting on a seat surface, with the upper body and thighs forming an angle of slightly more or less than 90°. Frequent sitting causes shortening of the front and back thigh and front hip muscles and the calf, with resulting damage to the spine, hip, and knee joint, as well as pressure sores can develop on the back of the thigh and buttocks, and other undesirable phenomena.

In order to at least reduce the strain on the spine, it is known to use chairs whose backrests are connected to the seat by a narrower connecting part in such a way that a person sits astride the chair and leans against the backrest with the stomach or chest. Since this is also not comfortable in the long run, chairs have been developed which specifically allow such an astride seat, either as the sole sitting posture or as an alternative sitting posture. For example, US 454, 100 describes a chair with a seat, two sloping thigh recesses, a central column rising obliquely upwards between the thigh recesses, and an elbow support in the form of a crossbar at the upper end of the central column. A sun deck chair is known from U.S. Pat. No. 3,220,771 with a tubular frame to which a seat approximately in the shape of a bicycle saddle is attached, wherein a section consisting of two parallel tubes connected at the outer end in a U-shape and pointing away from the seat obliquely upwards at an angle of approximately 45° carries an arm support which can be displaced on the parallel tubes.

From U.S. Pat. No. 4,832,407 and EP 0 163 437 A1, respectively, an office chair is known whose backrest has a narrow upper part and a wider lower part extending laterally in the form of wings. Both shapes allow both an ordinary sitting posture and an astride sitting posture, in which the sternum rests against the top of the backrest. In both seating positions, the forearms or elbows can rest on the wings of the backrest. In U.S. Pat. No. 4,832,407, a shin rest is provided to allow the knees to rest in the astride seat. In EP 0 163 437 A1, the seat surface is cross-saddle shaped, i.e., the edge centers are slightly raised and the corners are sloped.

From U.S. Pat. Nos. 5,295,728 and 3,754,787, work chairs or standing chairs are known in which the user sits on a saddle in an almost standing, slightly bent-forward posture and supports himself forwards on a chest support. Both the saddle and the chest support are height-adjustable. The forearms are completely free.

From U.S. Pat. No. 4,662,361 and USP 5, 971, 485 massage chairs are known which have a seat surface, a chest support and a forehead or face support and a forearm support, in the latter also a shin support. In a similar form, so-called knee chairs with a seat surface and a knee/shin support are also known, whereby the seat surface is comparatively strongly angled and the body weight is completely absorbed and balanced by the seat surface and the knee/shin support.

U.S. Pat. No. 6,287,243 B1 is an example of a variety of different training benches in which a seat section and a backrest section are arranged so that they can pivot relative to one another and a person can lie on them on their back or stomach, for example to perform various strength exercises.

The backrest part is typically wide enough to provide a stable support for the back or chest, but narrow enough to allow the arms to move freely next to the backrest part. In the above-mentioned printed material, the seat part and the backrest part can be pivoted to each other in a coupled movement, but forms are also known in which the seat part and the backrest part can be pivoted independently of each other relative to a base frame.

From DE 20 2009 005 763 U1 a prone reclining chair or short sleep reclining chair is known in which both the reclining surface and the seat surface are ergonomically adapted to the prone sleeping position, the reclining surface being at least slightly curved upwards and sloping down towards the long sides and becoming at least slightly narrower below the shoulder support and at the lowest part, and the seat surface meeting the reclining surface at the same width and being able to become wider again towards its end, so that the arms and legs can hang down, the head is supported and only the instep or the shin rests on the floor in order to enable a person to take a position which is completely unusual in everyday life for a short time.

All of the above-mentioned furniture, which can generally be described as a chair, has in common that in every possible posture, especially those perceived as particularly "ergonomic", the hip joint is more or less flexed. Especially for people who sit a lot on conventional chairs, the problem is that the front thigh and hip muscles often shorten and the spine is loaded unfavorably. Similar adverse effects can also be observed in the other trunk and leg muscles, such as the abdominal muscles, the back muscles, the leg flexors and the calf muscles.

It is known from the scientific literature that the lengthening of a muscle returns to its original state before stretching 15 minutes after the end of stretching exercises (for example Esposito F. et al., Time course of stretching-induced changes in mechanomyogram and force characteristics. J. Electromyography and Kinesology 2011, Vol. 21, pp. 795-802). There is evidence from clinical experience that when pressure is applied to the muscle attachment to the bone, extensibility is improved and sustained. This is explained by receptor-mediated feedback via the basal ganglia, resulting in a decrease in centrally mediated muscular counter-tension. This is due to the biomechanical principle that muscle attachments to bone cause tensile stress on bone even at rest and there is never neutral or positive compressive stress. It is also known that tissue becomes hyperelastic when pressure is applied to these cells. In a further publication, it is described that cells become extensible by prolonged pressure (Latorre et. al, Active superelasticity in three-dimensional epithelia of controlled shape. Nature 2018, Vol 563, pp. 203-208. https://doi.org/10.1038/s41586-018-0671-4).

When applying a pressure in the above sense, the after-effect time of the stretching can thus be significantly prolonged. This effect is used, for example, in osteopressure. So far, the application is mainly done manually by a therapist and, if necessary, with the help of aids such as pushers, rods, ball bars, balls, acupressure pens, etc. A disadvantage of such a therapy method is the high personnel effort and the requirement to go to a therapist or to have a therapist come, since a self-therapy is difficult or not possible at all. The same applies to other manual applications such as acupressure and massage.

SUMMARY OF THE INVENTION

One object of the invention is to provide a chair for receiving a person, for example, in a prone position or in a seated position, which is improved with respect to the prior art with respect to a more favorable body posture.

One object of the invention is to provide a chair for accommodating a person, for example, in the prone position or in a seated posture, which counteracts shortening of the hip and/or leg muscles and/or the abdominal muscles, in particular the hip flexor muscles, with associated tendons, ligaments and fasciae.

A further object of the invention is to create a chair for accommodating a person, for example in a prone or seated position, which allows specific stretching postures of the hip and/or leg muscles and/or abdominal muscles, in particular without having to interrupt other activities performed on the chair.

A further object of the invention is to provide a chair for accommodating a person, for example in the prone position or in the seated position, which is improved with respect to the prior art regarding the variability of the seat positions.

A further object of the invention is to provide a chair for accommodating a person, for example, in a prone position or in a seated position, which is improved with respect to the prior art regarding the adaptability to different body dimensions and shapes.

A further object of the invention is to provide a chair which has convertibility between a normal sitting posture to a normal chair, in particular an office chair, and a stretching posture which counteracts shortening of the hip and/or leg muscles, in particular the hip flexor muscles, with associated tendons, ligaments and fasciae.

A further object of the invention is to extend and facilitate the usability of a manual application in the sense of an osteopressure, acupressure or massage.

A further object of the invention is to enable a manual application in the sense of osteopressure, acupressure or massage in self-therapy, in particular without having to interrupt other activities.

The object is solved at least in partial aspects by the features disclosed herein. Advantageous further developments and preferred embodiments are also disclosed herein and form the subject of the sub-claims.

A chair according to the invention for accommodating a person comprises

- an upper body section having an upper body support surface adapted or adaptable to at least parts of a front of a torso or a back of a torso of a person placed on the chair, and
- a lower body section having a lower body support surface adapted or adaptable to at least parts of at least a front side of a thigh of the person, wherein the upper body section and the lower body section are arranged or arrangeable and fixable in a position relative to each other such that the upper body support surface and the lower body support surface cause a hyperextension posture of the hip joint of the person with a predetermined hyperextension angle.

As explained at the beginning, people who sit a lot on conventional chairs have the problem that the front thigh and hip muscles often shorten and their pull puts unfavorable stress on the spine. In the chair according to the invention, it is provided that the upper-body support surface and the lower-body support surface cause a hyperextension angle of the hip joint. For this purpose, for example, the upper body support surface and the lower body support surface may limit an angle of less than 180° in the direction of hyperextension. In other words, it can be described as the lower body support surface being inclined relative to a straight line extension of the upper body support surface by an overextension angle toward a person resting on the chair. The overextension angle is adjustable in steps or steplessly. It is preferably at least a few degrees. The overextension angle can be at least 3°, in particular at least 5° and preferably at least 7° or at least 10°. The angle can also be adjustable up to 90° or more, so that extension can still be achieved even as the mobility of the hip joint increases. Particularly in the case of women, it is also not unlikely that this angle will be reached over time. On the other hand, it is advantageous if the chair can be adjusted to allow flexion in the hip joint, since it may be that a person does not yet reach hyperextension at all, at least initially. The hyperextension angle actually assumed or set can therefore be adapted to individual circumstances, such as natural joint flexibility, training condition and/or training goal.

A person sitting on this chair has the thighs angled slightly backwards at the hip joint, so that shortening of the front thigh and hip muscles is counteracted. Regular use of the chair according to the invention thus counteracts the impairments caused by sitting with a conventional chair. The posture of the person improves. Regular use of the chair thus contributes to the person's well-being.

Preferably, the chair is designed in such a way that the hyperextension posture is effected on a person in the prone position or in the astride position on the chair.

Alternatively, the chair is designed in such a way that the hyperextension posture is produced on a person sitting on the chair, preferably with the back leaning against the chair.

Alternatively, the chair is designed in such a way that the hyperextension posture is effected on a person standing, in particular leaning forward, on the chair.

Alternatively, the chair is designed such that the hyperextension posture is effected on a person in a kneeling posture on the chair.

The chair can be designed in such a way that several or all of the above-mentioned postures are possible, and can in particular be convertible for changing the posture.

Preferably, the chair is designed in such a way that the upper body support surface, which is in particular adapted to an upper body front side, is inclined relative to the horizontal at an angle of at least 30°, in particular at least 40° and preferably at least 45°. This allows a person to sit or lie on the chair, in particular in the prone or forward position, and still perform certain activities, such as office work. The steeper the upper body support surface is arranged and the more the posture transitions into a standing/leaning posture, the easier it is to perform usual activities in the usual manner. Therefore, inclinations of the upper body support surface of at least 60° and in particular at least 70° with respect to the horizontal can also be appropriate. A certain backward inclination of the upper body is also conceivable. In any case, and especially in postures with the upper body leaning forward against the upper body support section, the arms are free for any usual operation. The upper body support section can be suitably shaped for this purpose, such as having corresponding cutouts through which the arms can extend forward. In a practical embodiment, the upper body section may include a chest support and an abdominal support, and the chest support may approach or even exceed 90°, for example, the abdominal support may be between 60-70° or more.

The steeper the upper body support surface is arranged, the greater the need for a support element to hold the person on the chair on the support surfaces without slipping off. Such support elements can be provided at different positions. For example, this may be a footplate to support the feet from below, a knee support to support an angled knee from below, a hip support to support the hip or buttocks from obliquely below/behind, and/or a saddle to support the person in the crotch. A footplate can also be adjustable in terms of flexion and/or extension of the ankle, so that stretching of the calf can also be achieved.

The hip support also ensures that a person sitting on the chair has his or her hips fixed to the chair so that the targeted hyperextension of the hip joint is safely maintained. In particular, the hip support can be designed to press the hip in the direction of the upper body support surface.

A chair in the terms of the invention is any device for accommodating or supporting a human body in a sitting, lying, kneeling, squatting or semi-standing, slightly leaning forward or other position, regardless of whether such a device would or could be referred to as a chair in common or specialized usage or could or would be referred to otherwise (such as a seat, stool, kneeling bench, armchair, couch, support, frame, etc.). For purposes of the invention, a prone position is a position in which a front side of the upper body faces a support surface of the chair. For the purposes of the invention, an upper body section is a section with a support surface that is designed to fully or partially accommodate or rest an upper body front or rear of the body, and a lower body section is in the context of the invention a section with a support surface that is designed for full or partial reception or contact of a lower body front side of the body, in particular the upper thigh front sides. In this context, the respective contact surfaces may be flat or curved, may be shaped to follow a standard body contour, or may be designed to be adaptable to different body contours. For the purposes of the invention, an overextended position of the hip joint is understood to be a position in which the hip joint is deflected backwards beyond a position corresponding to an upright stance.

A further aspect of the invention relates to a pressing device for application to the human body, which is designed for attachment to a chair or to or in connection with such a chair and has one or more pressure units, each with at least one pressure head, which is designed to apply local or punctiform pressure at a predetermined pressure location on the body of a person accommodated on the chair. With such a pressing device, the applicability of a manual application in the sense of osteopressure, acupressure or massage can be extended or facilitated and an application in self-therapy can be made possible. By connecting such a pressing device with a chair described above, which causes a stretching of certain muscles or muscle groups, a particularly advantageous effect can be achieved with regard to the efficiency of a stretching caused by such a chair. Since, by being attached to or connected to the chair, the positional relationship of the pressure elements is also predetermined with respect to a body of a person located on the chair, the application is simple and safe. A person located on the chair can continue to perform other activities. Particularly advantageously, the position of the pressure elements can be adjustable. A control system can further facilitate and simplify the application and make it safer and more reliable.

A further aspect of the invention relates to a chair, in particular as described above, having such a pressing device attached thereto or fixedly or detachably connected thereto.

BRIEF DESCRIPTION OF THE DRAWINGS

Selected embodiments of the present invention are described in detail below with reference to the accompanying drawings. It shows.

DETAILED DESCRIPTION

Figure 2:
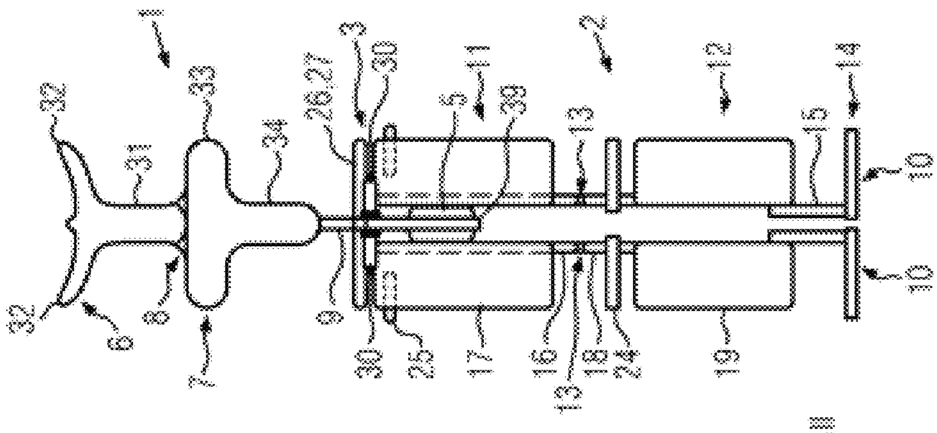
FIG. 2 the chair of FIG. 1 in a top view along a line "II-II" in FIG. 1 without a standing base.

All graphic representations are to be understood schematically. Directional and positional designations are used in accordance with the usual anatomical names and, unless otherwise indicated, refer to a body placed on the chair in the prone position. A longitudinal direction is basically understood as a direction running along the stretched spine or between the atlas and sacrum of the body placed in prone position on the chair according to the invention. However, a longitudinal direction can also be understood as a local directional indication of a direction that runs approximately through line II-II in FIG. 1 in the drawing plane. A transverse direction is understood to be a direction that runs through both hip joints or both shoulder joints of the body in prone position on the chair according to the invention and is perpendicular to the drawing plane in FIG. 1. A sagittal direction is understood to be a direction perpendicular to the longitudinal direction and the transverse direction, that is, perpendicular to line II-II in the drawing plane of FIG. 1 or perpendicular to the drawing plane in FIG. 2. A sagittal plane is understood to be a plane running in the longitudinal-sagittal direction and parallel to or in the drawing plane in FIG. 1. A medial plane is a sagittal plane which runs exactly in the center of the body. A frontal plane is a plane that runs in the longitudinal-transverse direction and lies parallel to or in the drawing plane in FIG. 2.

Figure 1:
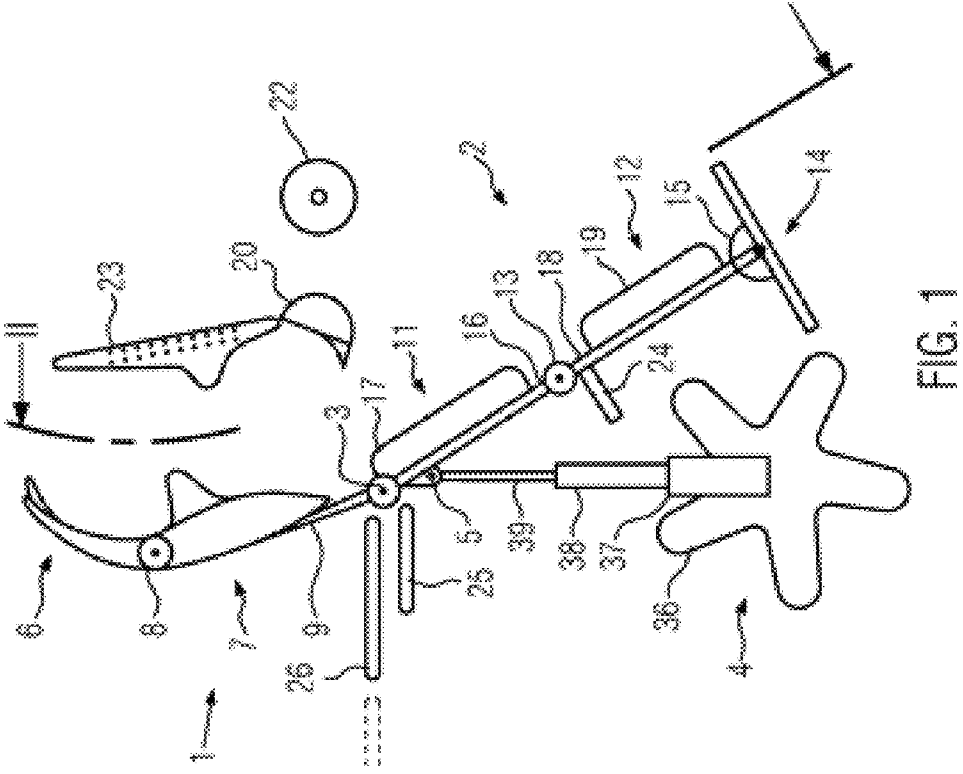
FIG. 1 a chair (basic form) according to an embodiment of the present invention in a side view.

A chair according to an embodiment of the invention has an upper body section 1 and a lower body section 2 as well as a standing base 4 (FIGS. 1 and 2). The upper body section 1 and the lower body section 2 are configured to form respective support surfaces that are at least partially adapted to an upper body at least in the region of the front of the torso, on the one hand, and to a lower body at least in the region of the front of the thigh, on the other hand, of a person. The upper body section 1 and the lower body section 2 are connected to each other via a central joint 3. The construction consisting of the upper body section 1 and the lower body section 2 is hinged to the standing base 4 via a base pivot joint 5.

The upper body section 1 has a chest support 6 and an abdominal support 7, which are connected to each other via an intermediate joint 8, which is referred to below as the upper intermediate joint 8 for purposes of differentiation. The chest support 6 has a sternum strut or sternum bearing 31 and two side wings 32. The sternum brace 6 may be a single piece, a two piece, or may comprise or include a plurality of connected compression pads. The sternum support/strut 31 is configured to abut or bridge a sternum of the person supported in the prone position on the chair, and is comparatively narrow and or recessed in axis to avoid uncomfortable pressure on the inner regions of the large pectoral muscles or breasts of female persons and pressure points from clothing such as buttons or bra straps. The side wings 32 extend upwardly from an upper part of the sternum support 31 at a slight angle to provide the widest possible lateral support to the upper chest of the person from below the collarbone. Also, the side wings 32 are configured to skirt the breasts of a female person, i.e., to be disposed above them, and terminate in width approximately in front of a corner shoulder joint of the person so that the mobility of the shoulders remains unimpeded. The abdominal support 7 has a rib cup 33 and an abdominal region 34.

The rib shell 33 is designed and constructed for cradling a lower rib cage of the person in a shell-like manner. The rib shell is thin so that a leg can be placed thereunder, but may also be reinforced for attachment of an arm rest. The abdominal region 34 extends downwardly from a lower end of the rib shell 33, and is configured and formed to rest against an abdomen of the person. The abdominal region 34 is narrower than the rib shell 33 so that the legs can also be moved in front of the body (see FIGS. 3, 4, 12). All parts can be multi-piece.

A rocker 9 connects the upper intermediate joint 8 to the central joint 3 (FIGS. 1, 2). In this embodiment, the rocker 9 is substantially rigid in itself, but may have some elasticity or spring mechanism of its own. The certain elasticity is intended to be stiff enough to provide the upper body section 1 with a sufficient abutment to support the person. Depending on the height and weight, a different elasticity may therefore be appropriate.

Optionally, the rocker 9 can be designed to be telescopic for adaptation to different upper body lengths, and the abdominal support can further be slidable and fixable relative to the rocker. Via the upper intermediate joint 8, the chest support 6 and the abdominal support 7 are at least pivotable with respect to each other in the medial plane (i.e., about a transverse axis) to allow adaptation to an individual contour of the chest and abdomen, but may also be tiltable and rotatable to also achieve stretching of the lateral muscles, ligaments and fasciae and/or to assume favorable positions with respect to an activity performed on the chair. With respect to this direction of movement, the upper intermediate joint 8 is designed to be lockable, so that once a pivoted position between the chest support 6 and the abdominal support 7 has been set, it can be effectively fixed. The upper intermediate joint 8 can also be omitted.

Optionally, the upper intermediate joint 8 can be designed so that the chest support 6 and the abdominal support 7 can be pivoted as a unit with respect to the rocker 9 in one or two or three axes in order to improve the mobility of the upper body during activities performed by a person. With regard to this type of movement, the upper intermediate joint 8 can also be designed to be lockable, but it can also be free to move. To avoid extreme positions and to prevent accidents, a limitation in the range of motion can be provided. Optionally, elastic and/or damping components may also be provided. For example, the upper intermediate joint 8 may have a rubber/plastic or spring element that allows limited elastic movement of the chest support 6 and/or the abdominal support 7 and/or both together, with a return to a center position when unstressed. Alternatively, a spring-loaded lever mechanism may be provided for this purpose.

The chest support 6 may also be designed so that the side wings 32 follow the movement.

Due to the special design of the chest support 6 and the abdominal support 7 as well as the mobility of the same in relation to each other, the upper body section 1 can be variably adapted to a contour of an upper body front side of the person lying on the chair in prone position, so that the person can take up a comfortable position. Muscles and breasts are not squeezed, and shoulders and arms can move freely.

Optionally, an arm rest may be provided which allows one or both arms to be comfortably placed in front of the upper body but does not further restrict mobility (not shown in more detail).

Such an arm rest may be attached to the side wings 32 or laterally on either side or one side of the rib shell 33 (not shown in more detail).

Optionally, the arm rest can be folded down via a mechanism to form the foot roller (22, described in more detail below). For this purpose, the arm rest can be attached to or near the central joint 3 or to the thigh support.

Via the central joint 3, the upper body section 1 and the lower body section 2 can be pivoted relative to each other at least in a sagittal plane (i.e. around a transverse axis). In principle, it may be sufficient for the lower body section 2 to be pivotable as a whole relative to the upper body section 1. In the present embodiment example, the lower body section 2 has two separate leg parts 10 and, accordingly, the central joint 3 has two separate single joints 30, which are attached laterally to the rocker 9 and are each associated with a leg part 10 and via which the respectively associated leg part 10 can be pivoted individually relative to the upper body section 1. In this embodiment example, the rocker 9 extends beyond the central joint 3 further into the region of the lower body section 2 and carries at its lower end the base pivot joint 5 for connection to the standing base 3. The standing base 4 is cut away in FIG. 2 to improve the clarity of the drawing.

As an alternative to the connection of the central joint 3 to the rocker 9 described above, a central frame (not shown in more detail), which may be reinforced, can also be provided to support the central joint 3 and/or the base pivot joint 5.

The position of the central joint 3 as well as the articulation of the base pivot joint 5 can be designed in any conceivable form. As an alternative to the form described above, it would also be conceivable to offset the central joint 3 upwards compared to the illustration in FIG. 2, as shown for example in the side views in FIGS. 3-8, 11, 12. The structural design of the connection of rocker 9, central joint 3 (with single joints 30) and base pivot joint 4, if provided, can also be executed in any conceivable form.

Each single joint 30 is configured to allow pivoting and/or rotation of the entire leg part with respect to the upper body section 1. The single joint 30 allows at least one pivot in a sagittal plane (i.e., about a transverse axis) to provide a flexion or extension angle of a hip joint of the person. Optionally, the single joint 30 may additionally enable pivoting in a frontal plane (i.e., about a sagittal axis) to predefine an angle of spread of the leg parts 10. Further, a torsion (i.e. a rotation in a longitudinal axis of the respective leg part 10) may additionally be provided to predefine an outward or inward rotation of the leg parts 10. The respective degrees of freedom can be integrated by individual partial joints (such as hinges, axles, ball-like) or realized in series or as a combination joint (such as a ball joint). Thus, the central joint 3 can optionally allow up to three directions of movement (directions of rotation) via the single joints 30 (cf. also FIGS. 25, 26).

The central joint 3 or each of its single joints 30, possibly in possible partial joints, is designed to be lockable, i.e. fixable in a respectively set position.

Optionally, in addition to the single joints 30, the central joint 3 can have an additional overall swivel joint (not shown) that allows the lower body section 2 to be pivoted as a unit with the leg parts 10 fixed in their respective pivoting positions relative to the upper body section 1. In this case, it is advantageous if the overall pivot joint is arranged near or in a line connecting the single joints. Also, such an overall pivot joint may optionally be designed for rotations about further axes in addition to the pivoting about the horizontal axis, for example to allow a torsion and/or a lateral tilting movement in the lower spine. The overall pivot joint and the single joints can have a common transverse pivot axis or different transverse pivot axes at least with respect to a pivot direction of the overall pivot joint.

Each of the leg parts 10 of the lower body section 2 has a thigh support 11 and a lower leg support 12. The thigh support 11 and the lower leg support 12 are connected to each other via an intermediate joint 13, which is referred to below as the lower intermediate joint 13. In variations described further below, the leg parts 10 may be connected to each other and the thigh support 11 and the lower leg support 12 may be connected to each other, or all parts may be fixedly connected to each other. Further, each of the leg parts 10 includes a foot support 14 connected to the lower leg support 12 by an end joint 15. The foot support 14 may push upward with a spring or other device on the side of the toe. The foot support 14 may be designed to tilt, rotate and pivot.

More specifically, the thigh support 11 has a thigh bar 16 and a thigh pad 17. The thigh pad 17 may comprise a support plate with padding attached thereto (not shown in more detail) and is fixedly attached to the thigh bar 16, and in variations may be slidable and fixable. The thigh bar 16 is hinged to the rocker 9 of the upper body section 2 via the associated one of the single joints 30. With the measures described above, the lower body section is adapted to abut against a front side of the thigh. It should be noted that individual ones of these measures may also be omitted.

Also, the lower leg support 12 has a lower leg bar 18 and a lower leg pad 19. The lower leg pad 19 may have a support plate with padding attached thereto (not shown in more detail) and is fixedly attached to the lower leg bar 18, and in variations may be slidable and fixable. The lower leg bar 18 is hinged to the thigh bar 16 of the associated thigh support 11 via the lower intermediate joint 13.

In this embodiment, the lower intermediate joints 13 and the end joints 15 are pure pivot joints that only allow pivoting about a transverse axis. The lower intermediate joints 13 and the end joints 15 are designed to be lockable. Optionally, the thigh bar 16 and/or the lower leg bar 18 are designed to be telescopic. Optionally, the intermediate joints 13 and/or the end joints 15 can also permit further degrees of freedom.

A hip counter-bearing element 20 is arranged at a distance from the central joint 3 via a bow or other strut part (not shown in more detail). The hip counter-bearing element 20 serves to provide support for the hip of a person lying in a prone position on the chair at a predetermined distance from the central joint 3, so that the hip is prevented from deviating away from the central joint 3. The hip counter-bearing element 20 may be modeled on a contour of a person's bottom in the form of a shell or saddle, or it may be formed as a plain roller or plain beam, or in even simpler form as a belt or strap. The hip counter-bearing element 20 may provide a tailbone recess and include compression elements (see below). The distance of the hip counter-bearing element 20 from the central joint 3 is adjustable and fixable. Optionally, a longitudinal position of the hip counter-bearing element 20 is also adjustable and fixable. In further optional variations, the hip counter-bearing element 20 can also be designed to be removable. Furthermore, in further optional variations, the hip counter-bearing element 20 can be used inverted as a headrest for an ordinary sitting position (cf. FIG. 10). In the latter case, the hip counter-bearing element 20 may advantageously have a padded rear side. The hip counter-bearing element 20 may optionally also be formed to fold out from under a seat surface, or to swing down from the side or from the front or rear part of the seat surface, or from under the abdominal part, or to swing down from the head part with a large lateral bow. The hip counter-bearing element 20 may be tethered laterally (i.e., externally adjacent to a leg part 10) or centrally (i.e., between the leg parts 10). When the upper body section 1 and the lower body section 2 form respective support surfaces that support an upper body and a lower body of a person in a prone position such that a hip joint of the person is imparted a hyperextension, the hip counter support member 20 ensures that the hip joint of the person is held in this hyperextended position (cf. FIGS. 3, 4, 5, 6, 7, 12). This fact will become even clearer by the following description of special applications.

A foot roller 22 is arranged via a bow or other strut part (not shown in more detail) at a distance from the central joint 3, located behind the hip counter bearing element 20. The foot roller 22 serves to allow a person supported in a prone position on the chair to bend one leg or both legs and hook the foot behind the bottom, and is optionally adjustable to accommodate increasing stretching (cf. FIGS. 6, 7). To support this position, especially when both legs are bent, a knee support 24 (FIG. 6) can be provided on which one knee of the person can rest. Optionally, the distance of the foot roller 22 from the central joint 3 can be adjusted and fixed. Optionally, a longitudinal position of the foot roller 22 is also adjustable and fixable. The foot roller 22 may extend across the entire width of the chair, so that it may optionally be used for both feet. Alternatively, two foot rollers 22 may each be provided for one side. The foot roller 22 may be tethered laterally or centrally (i.e., between the leg parts 10). The foot roller 22 is optional and may also be omitted and/or designed to be removable. In variations, the foot roller 22 may be pivoted out of an optional armrest by a pivot mechanism or created from the armrest by a folding/swinging/sliding mechanism. Further, in other optional variations, the foot roller 22 may be used inverted as a headrest for an ordinary seating position (cf. FIG. 10). The foot roller 22 can optionally also be designed to be folded out from under a seat surface, or from the side or from the front or rear part of the seat surface, or from under the abdominal part, or to be designed to be swung down from the head part with a large lateral bow.

A back support 23 is arranged via a bow or other strut part (not shown in more detail) at a distance from the upper body section 1, located above the hip counter-bearing element 20 (FIG. 1). The back support 23 serves to provide an abutment to a back of a person supported in a prone position on the chair (cf. FIG. 8). Optionally, the distance of the back support 23 from the upper body section 1 is adjustable and fixable. Optionally, a longitudinal position of the back support 23 is also adjustable and fixable. Further optionally, the back support 23 is movable about a transverse axis. The angular position about the transverse axis may be limitable and/or adjustable and fixable. The back support 23 may be tethered laterally or centrally (i.e., coming from between the leg parts 10 and guided behind the hip counter-bearing element 20). The back support 23 is optional and may also be omitted and/or designed to be removable.

A knee rest 24 is attached to the lower leg bar 18 above the lower leg pad 19, and a foot rest 25 is attached to the thigh bar 16 below the central joint 3 or below the leg rest 26 (FIGS. 1, 2). One knee rest 24 and one foot rest 25 may be provided for each side of the chair. The knee rest 24 serves to rest one knee of the person and is designed to be foldable (in FIGS. 1, 2 and further figures the knee rest 24 is shown folded into a non-functional position). The foot rest 25 serves to support one of the person's feet and enable the person, while maintaining the basic prone position on one side (cf. FIG. 4) or on both sides (cf. FIG. 8), to at least temporarily abandon the hyperextension of the hips and instead assume a flexed hip position with more or less pronounced stretching of the gluteal and back muscles, in particular the gluteal muscles. With the feet supported on both sides by the upper foot rests 25, a squatting position is assumed which can be effectively stabilized by the back support 23 described above (cf. FIG. 8).

The knee support 24 and the foot rest 25 can each be designed to be height-adjustable and fixable. They are, moreover, optional and can also be omitted and/or designed to be removable.

A further variation in the possible applications of the chair is achieved by a leg rest 26, which is still connected above the upper foot rest in the area of the central joint 3 via a bow or other strut part (not shown in more detail) (FIGS. 1, 2). An angular position of the leg rest 26 may be adjustable and fixable in inclination, rotation and pivoting. Optionally, the leg rest is also telescopic or adjustable and fixable in its distance from the central joint 3. The leg rest 26 is used to elevate a leg of the person when the knee is bent and will generally be adjusted horizontally when in use (cf. FIGS. 3, 12). The leg rest 26 is generally configured to be hinged to the upper body section 1. The leg rest 26 is optional and may also be omitted and/or designed to be removable.

Figure 5:
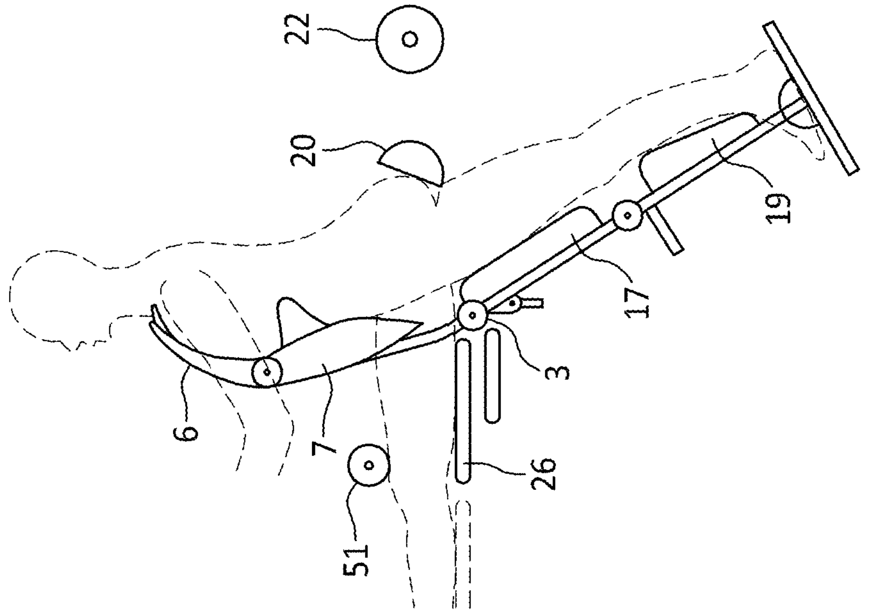
FIG. 5 the chair of FIG. 1 in another practical application.

A rest extension 27 is provided in extension of the leg rest 26 and connected thereto (FIGS. 1, 2). The leg rest may be attachable to the leg rest 26 or hinged by a joint (not shown in more detail). It may optionally be telescopic and/or height-adjustable and/or pivotable and/or removable. A position of the rest extension 27 may be adjustable and fixable. The rest extension 27 serves to elevate a leg of the person with the knee extended (cf. FIG. 5). To fix the position of the leg, a hold-down device 51 can be provided, which provides a support for the thigh above the knee to prevent it from moving away from the leg rest 26 (FIG. 5). A distance of the hold-down 51 from the leg rest 26 may be adjustable and fixable. The rest extension 27 is optional and may be omitted and/or may be designed to be removable. Similarly, the hold-down device 51 is optional and may also be omitted and/or designed to be removable. Optionally, the foot roller 22 may be configured and/or usable as the hold-down device 51 in a convertible manner, or the hold-down device 51 may be configured and/or usable as the foot roller 22 in a convertible manner.

The standing base 4 of the chair has a base frame 36, a sleeve 37 and a gas cylinder 38. The base frame 36 is designed to be placed on a floor and is in the form of a pentagon, a plate, a frame or other suitable shape. The base frame 36 supports the sleeve 37, in which the gas cylinder 38 is fixedly mounted. The gas cylinder 38 points vertically upward and carries a piston 39 on a gas cushion. The piston 39 ends in the base pivot joint 5. The piston 39 is rotatably mounted in the cylinder 38. The piston 39 and the cylinder 38 can also be used to adjust the height of the chair. The basic pivot joint 5 and the central joint 3 can be attached to a common support (not shown in more detail). The support may be a sheet, tube or other frame or node.

Figure 36:
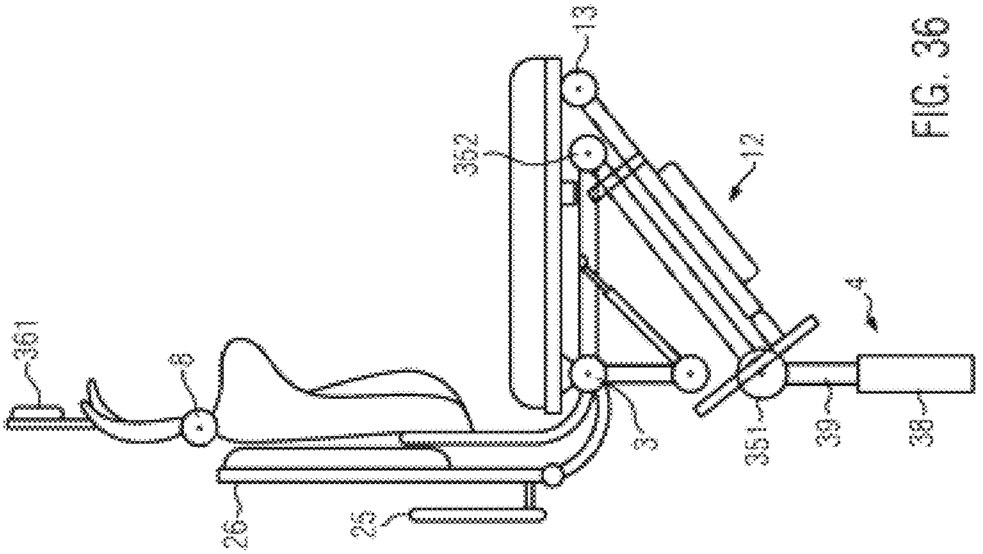
FIG. 36 the chair according to FIG. 1 with a variant of the underframe and folded leg rest and head rest according to a further embodiment of the present invention.
Figure 35:
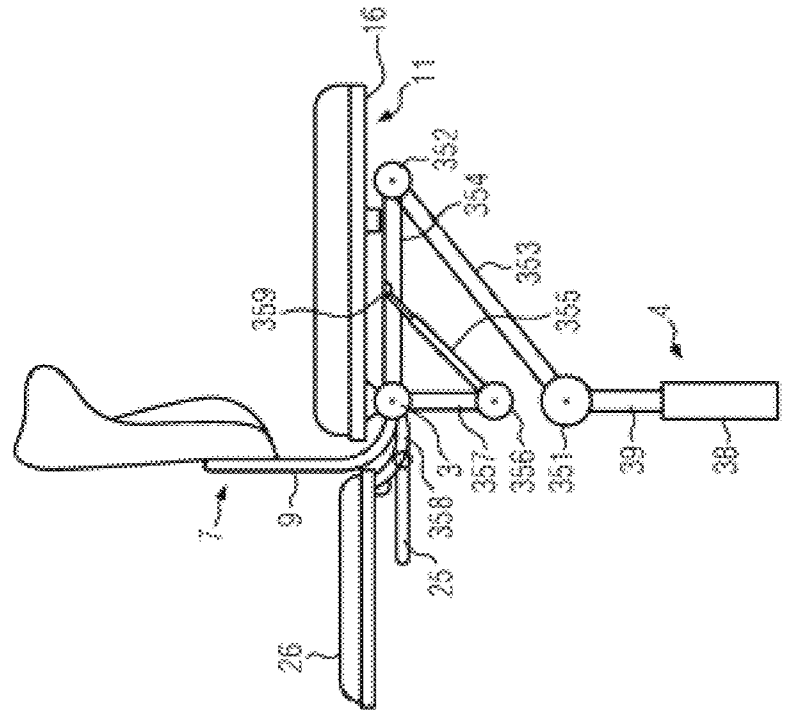
FIG. 35 a chair according to FIG. 1 with a variant of the underframe according to a further embodiment of the present invention.
Figure 37:
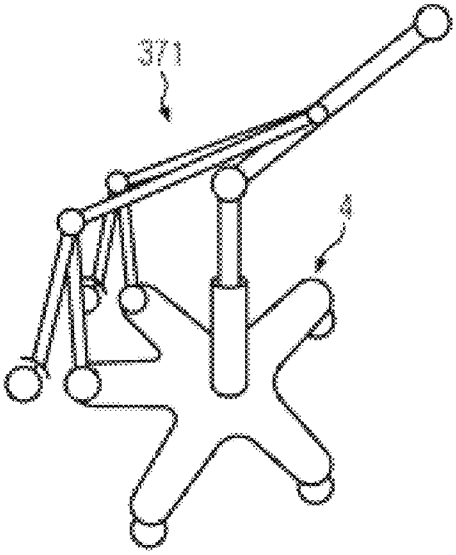
FIG. 37 a folding mechanism for increasing stability for a chair according to a further embodiment of the present invention.

The standing base 4 can also assume any other conceivable shape. Further examples of this are shown in FIGS. 35-37. Further below, embodiments are also described in which the chair according to the invention is designed in a screw-on variant that can be mounted on another chair or on a table or other object, or with other base solutions. Instead of a five-prong shown, another multi-prong variant, a frame or a plate could be provided. The standing base 4 may have wheels, as is common with office chairs. Such wheels may optionally be lockable. The cylinder 38 may be releasable and lockable by a lever mechanism, as is common practice with office chairs. A hydraulic or pneumatic drive for the cylinder 38 may also be provided. Furthermore, a motorized drive may also be provided. In this way, the standing base 4 can be designed to extend and retract without the person having to support himself on the floor or base frame 36. Another option may relate to a stepped or stepless height adjustment of the entire standing base with locking or fixing. In one simple form, such an option may be implemented by a standing tube having radial detent holes spread along its length and locking pins which selectively engage the detent holes and against which a sleeve tube carrying the cylinder 38 may be supported. As a further option, the base pivot joint 5 can be implemented by a parallel link arrangement.

In this case, a height adjustment of the standing base can be coupled to a pivoting of the thigh bar 16 via the parallel link arrangement. Also conceivable is the chair according to the invention in the form of a fixed frame. A height adjustment need not be mandatory in every case. Further optionally, the standing base 4 can be secured against slipping or can be locked (manually or automatically when the chair is unfolded in the prone position).

As suggested above, the upper body section 1 and the lower body section 2 form respective support surfaces that support an upper body and a lower body of a person in a prone position such that a hip joint of the person is imparted a hyperextension. In this regard, the hip counter bearing element 20 may provide for holding the hip joint of the person in this hyperextended position. In this embodiment the upper chest (i.e., the sternum and above) rests against the chest support 6, the lower chest and abdomen rest against the abdominal support 7, a thigh rests against the thigh pad 17, and the bottom rests against the hip counter bearing element 20, which is held at a distance such that the hip assumes just that desired hyperextension position (cf. FIGS. 3, 4, 5, 6, 7, 12). This gently stretches the hip flexor muscles, tendons, ligaments and fasciae, thus counteracting shortening of these tissues. The degree of stretching can be adjusted via the central joint 3 and, if necessary, increased gradually or continuously depending on the degree of stretching. The prone position on the convex abdominal support also stretches the back muscles. A stretching of the abdominal muscles can also be achieved via the chest support, which relieves the upper back.

The chair according to this embodiment allows a variety of variants of this position. In the basic position, which is not specifically shown in the drawing, both thighs rest on the thigh pads 17, both lower legs rest on the lower leg pads 19 and both feet rest on the foot supports 14. It is not absolutely necessary to rest the lower legs in a relatively upright position. However, the lower-leg support prevents the lower legs from slipping when they are already at a slight angle to the horizontal.

Figure 3:
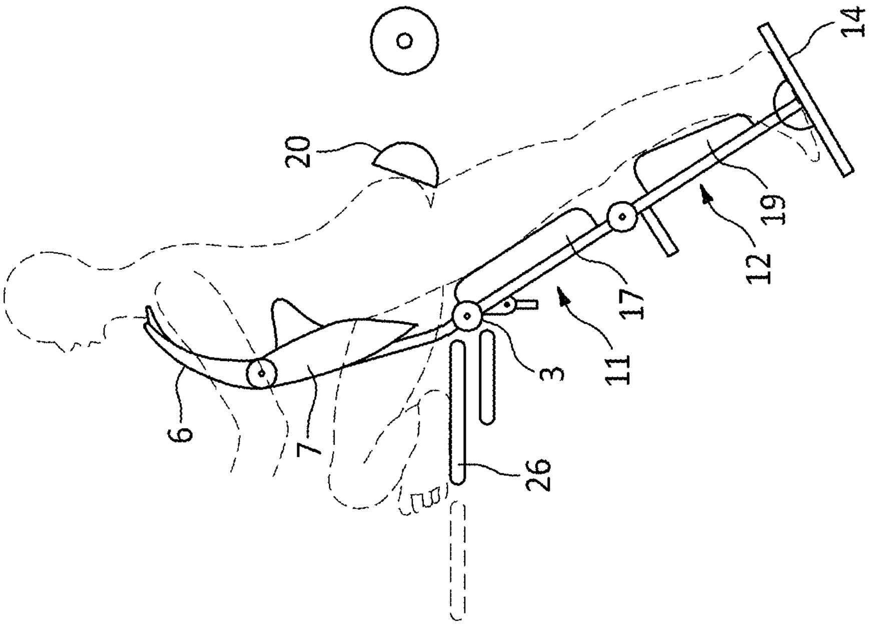
FIG. 3 the chair of FIG. 1 in a practical application.

In another practical application, a leg can be released from the hyperextended position and placed bent in front of the body on the leg rest 26 (FIG. 3). In addition to the muscles described, the abductor and internal rotator muscles with associated tendons, ligaments and fascia can also be stretched.

Figure 12:
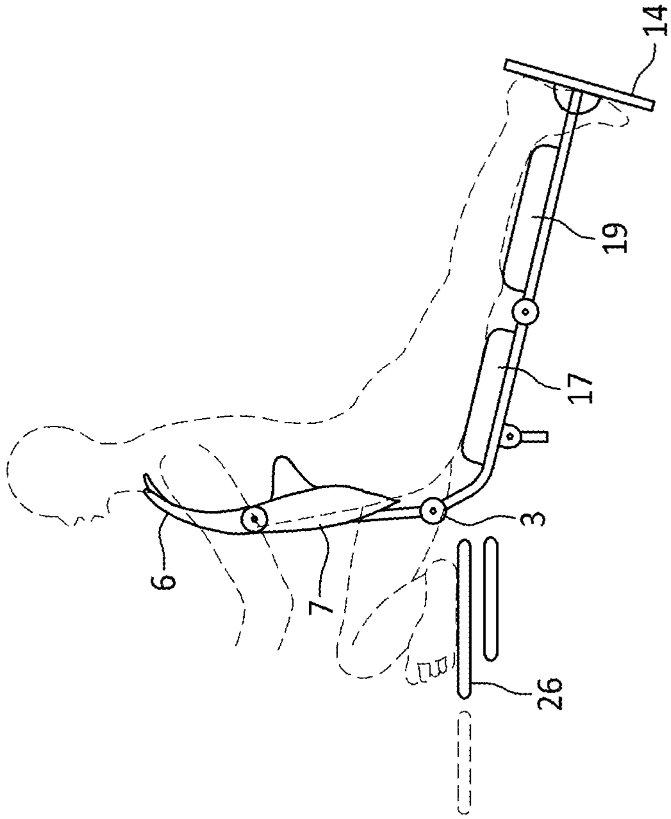
FIGS. 11, 12 the chair of FIG. 1 in another position and practical application.
Figure 11:
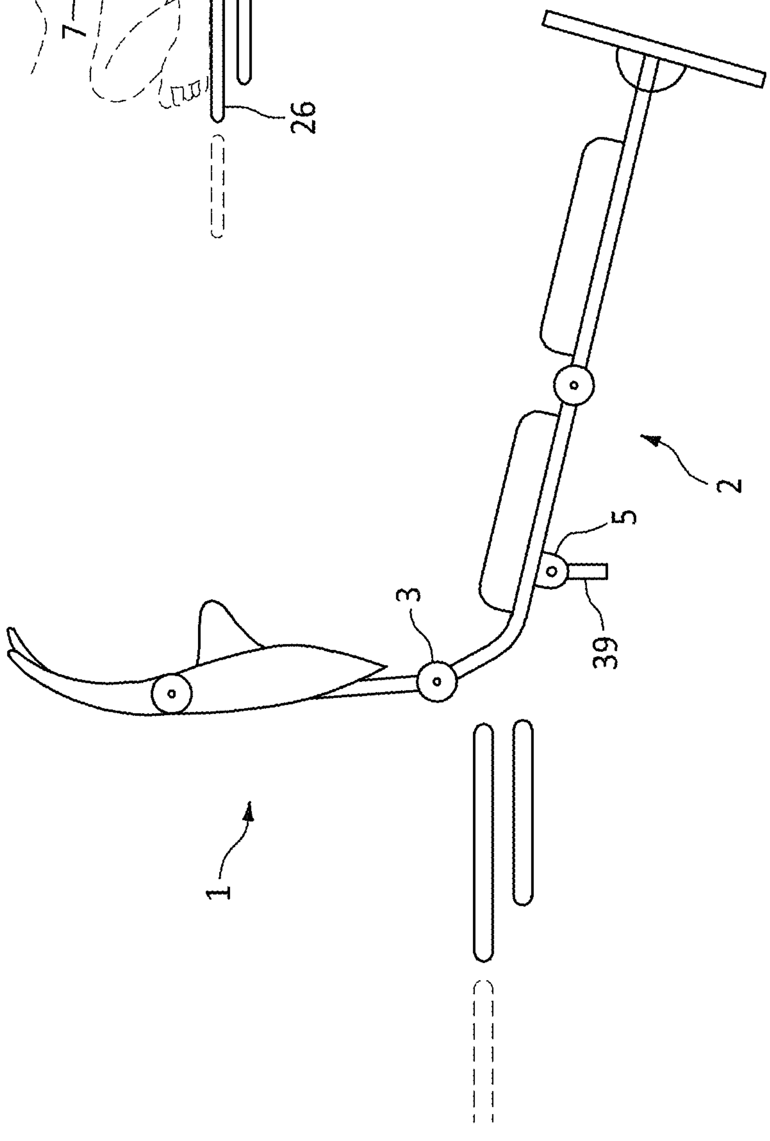

The stretch can be further increased if the hyperextension angle of the chair is increased even more (FIGS. 11, 12).

Figure 4:
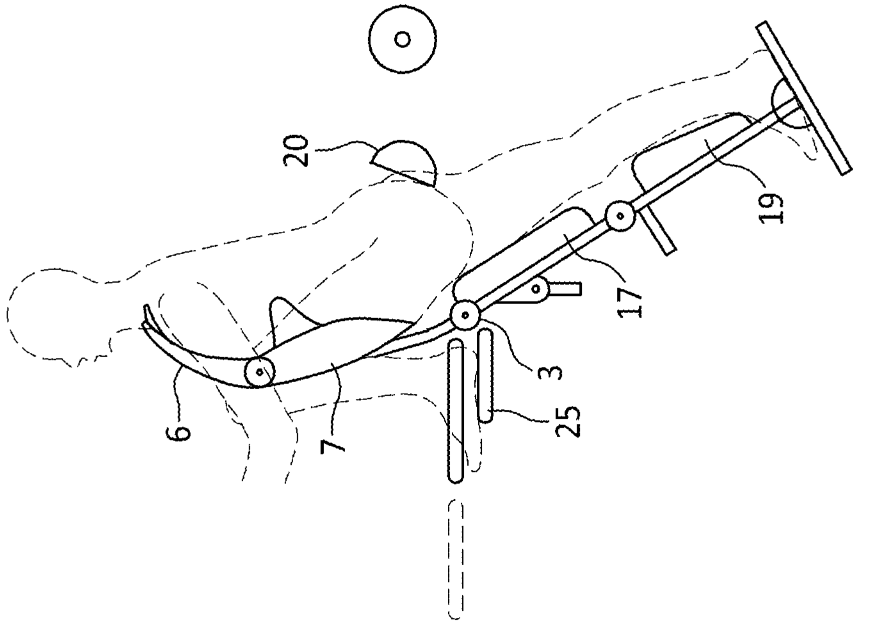
FIG. 4 the chair of FIG. 1 in another practical application.

In another practical application, a leg can be released from the hyperextended position and placed in front of the body on the foot rest 25 (FIG. 4). This can also stretch the hip and knee extensor muscles with associated tendons, ligaments and fascia.

In another practical application, a leg can be released from the hyperextended position and placed stretched out in front of the body on the leg rest 26 and the rest extension 27 (FIG. 5). This can also stretch the hip extensor and knee flexor muscles with associated tendons, ligaments and fascia. The hold-down device 51 helps to keep the leg extended. The leg can also be placed on the leg rest 26 without the rest extension 27, with the knee bent and the lower leg hanging.

Figure 7:
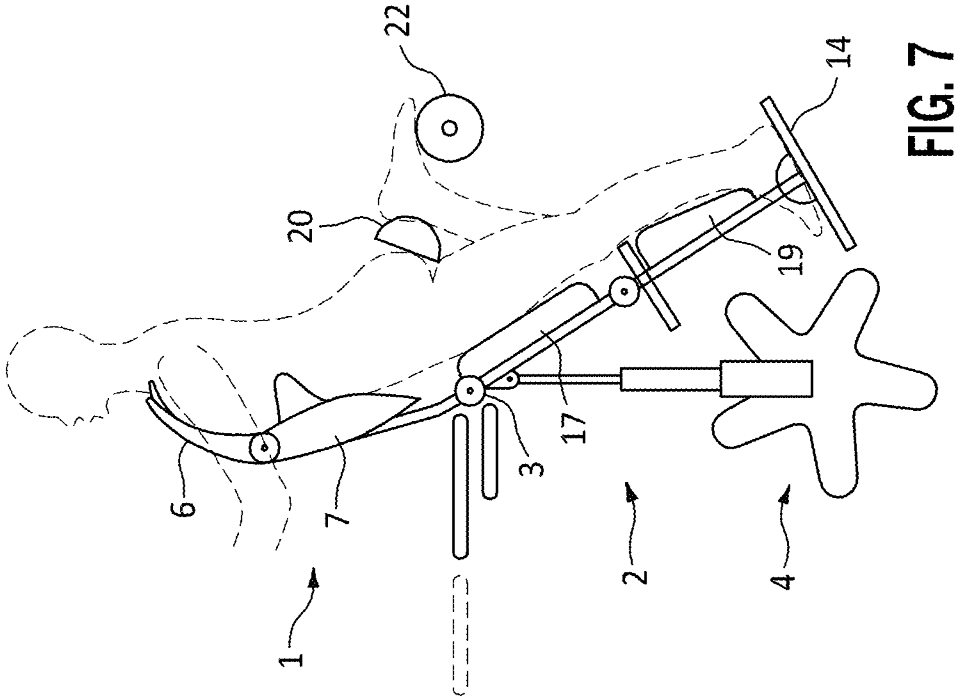
FIG. 7 the chair of FIG. 1 in another practical application.

In another practical application, a foot can be taken from the foot rest 14 and hooked into the foot roller 22 behind the body (FIG. 7). The hip extensor muscles remain hyperextended, and the knee extensor muscles with their associated tendons, ligaments and fasciae can also be stretched.

Figure 8:
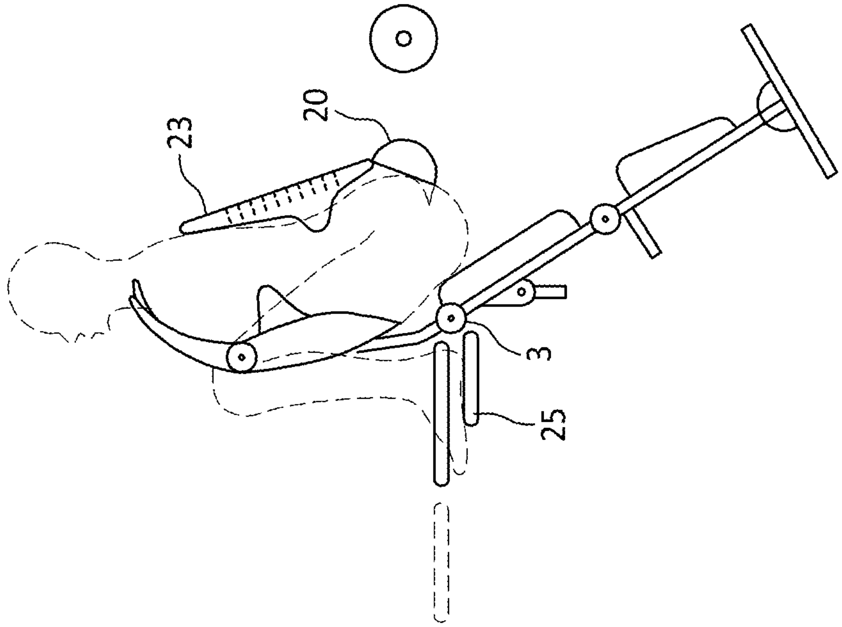
FIG. 8 the chair of FIG. 1 in another practical application.

In another practical application, both legs can be released from the hyperextended position and placed in front of the body on the lower foot rest 24 or (preferably) the upper foot rest 25 (FIG. 8). As with the one-legged version (cf. FIG. 4), the hip and knee extensor muscles with associated tendons, ligaments and fasciae can also be stretched. In addition, the back muscles can be gently stretched and the lumbar spine relieved. The back support 23 helps to stabilize this position.

Figure 6:
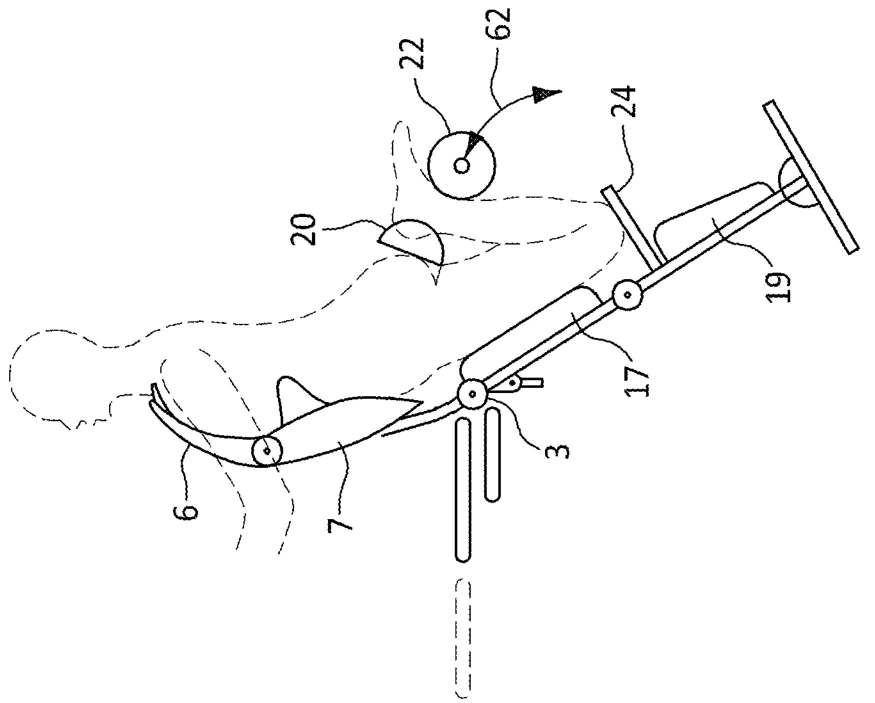
FIG. 6 the chair of FIG. 1 in another practical application.

In another practical application, both feet can be taken from the foot rest 14 and hooked into the foot roller 22 behind the body (FIG. 6). The hip extensor muscles remain hyperextended, and the knee extensor muscles with their associated tendons, ligaments and fasciae can also be stretched. At the same time, the feet can be relieved and an accumulation of blood in the feet can be avoided or reduced. A changed position of the foot roller 22 (direction arrow 62) can help to find a comfortable and/or particularly effective position. Knee supports 24, which are attached to the lower leg bar 18 and are shown folded into the functional position in FIG. 6, can help to stabilize this position.

Figure 10:
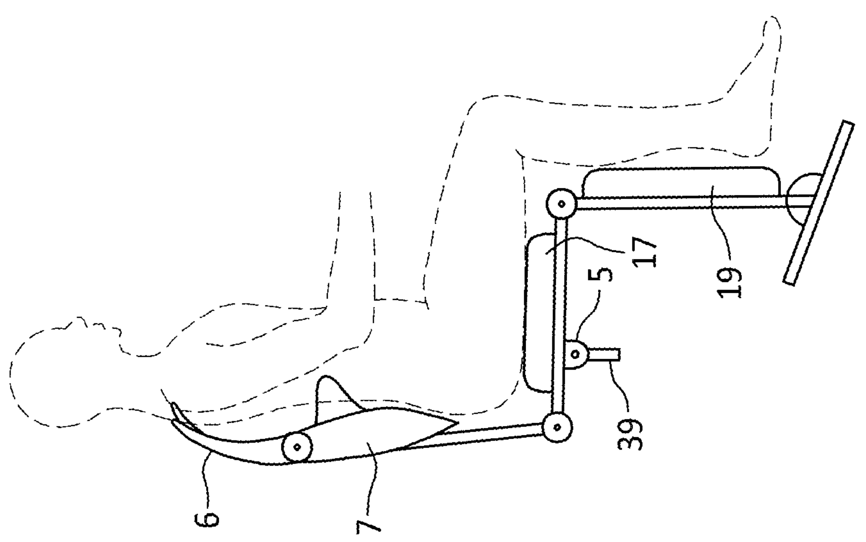
FIGS. 9, 10 the chair of FIG. 1 in another position and practical application.
Figure 9:
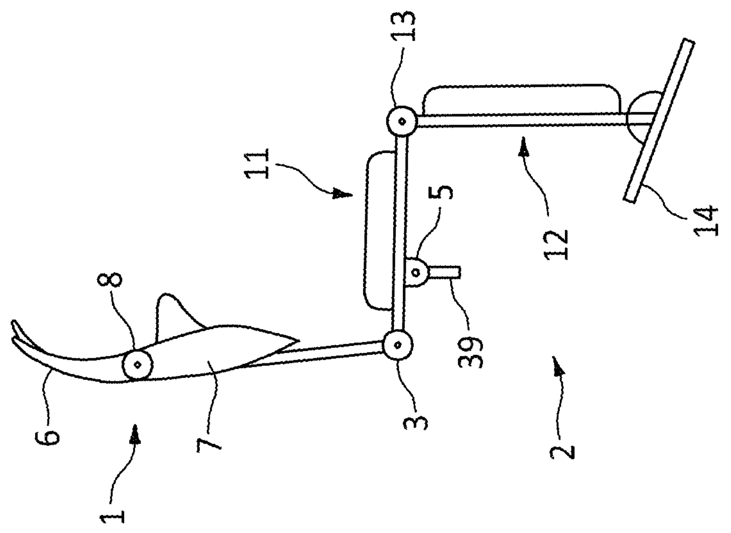

Due to the central joint 3 and the lower intermediate joint 13, the chair can also offer a seated position in another practical application (FIGS. 9, 10). In this case, both the central joint 3 and the intermediate joint 13 are brought into an approximately right-angled, opposite position and the thigh support 11 is brought into an approximately horizontal position by means of the base pivot joint 5. The lower leg support 12 can be pivoted backwards under the thigh support 11 to allow legroom, and the lower leg support 12 can be equipped with one or more joints for this purpose. Connectable air cushions (not shown in more detail) in the chest support 6 and the abdominal support 7 can help to adapt the support surface to a person's back contour. It should be noted that in this illustrated position, the chair according to the invention may be dimensioned and configured to meet the requirement for an office chair. The requirements for an office chair are defined in various industrial or commercial standards. Currently, for example, DIN EN 1335-1, DIN EN 1335-2 and/or DIN EN 1335-3, in the 2002 version and/or in the 2018 version are authoritative. The chair can preferably be designed according to type C of this standard, alternatively type B or alternatively type A.

Figure 13:
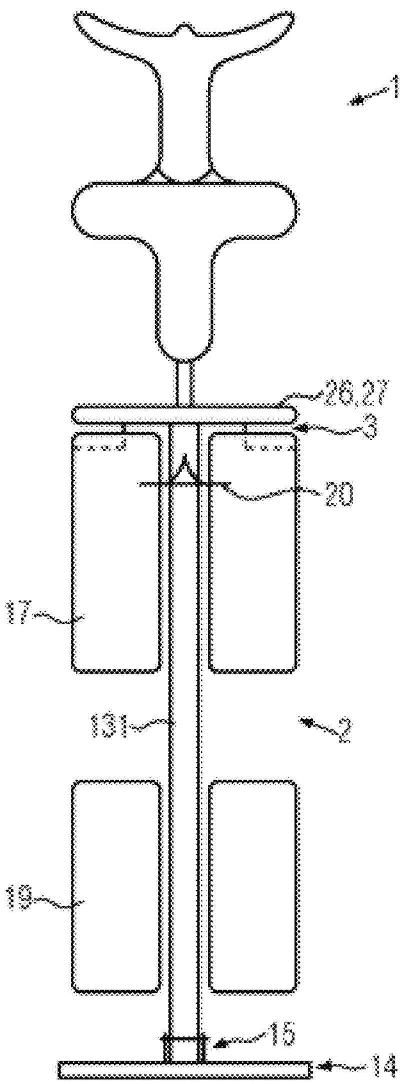
FIG. 13 a chair (variant 1) according to a further embodiment example of the present invention with non-adjustable elements of a lower body section in a view according to FIG. 2.

In another embodiment of the present invention as shown in FIG. 13, the chair has, as before, an upper body section 1 and a lower body section 2 connected to each other by a central joint 3, and is constructed in further details in the same way as the chair shown in FIGS. 1, 2, except for the variations described below. Deviating therefrom, the lower body section 2 is one-piece, that is, is not divided into two leg sections, and also does not have intermediate joints. Accordingly, the lower body section 2 has a single frame 131 to which two thigh pads 17 and two lower leg pads 19 are attached, as well as a single foot support 14 for both feet via a single end joint 15. The central joint 3 provides only a single pivot direction in the transverse direction. This embodiment is of much simpler construction than the previous one, and is therefore less expensive to manufacture, while still exhibiting the central function of controlled hip hyperextension in the prone position.

Figure 14:
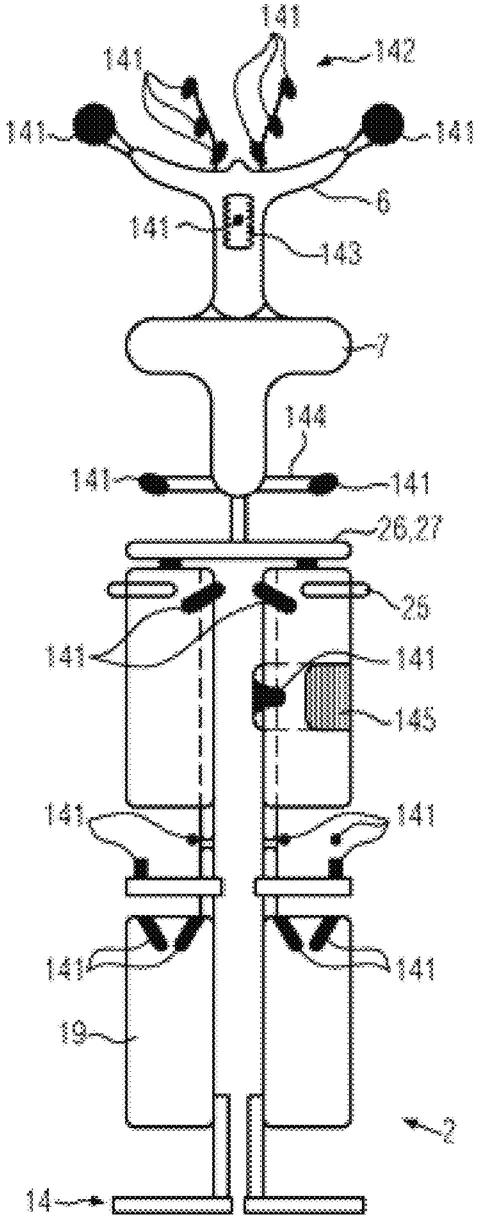
FIG. 14 a chair with partially drawn-in pressure elements according to a further embodiment example of the present invention in a view corresponding to FIG. 2.

An optional addition, which is also an independent aspect of the invention, is realized by a pressing device, which is illustrated in FIG. 14 as an extension of the first embodiment example according to FIG. 1. Here, the pressing device comprises pressure units 141 which are provided at selected locations provided of the chair and which are designed and configured to apply pressure at specific pressure locations on the body of the person. The respective pressure units 141 can be attached to the chair individually separately or in groups (modules) or can be detachably or non-detachably connected to the chair.

As described at the beginning, the extensibility of a muscle can be improved by applying strong pressure to its insertion or origin for a long time. The pressure units 141 are provided for this purpose. The pressure units 141 can be variably adjustable in localization, the pressure direction can be adjustable, the pressure intensity can be adjustable, and the pressure head can be designed to be replaceable.

For example, the pressure units 141 may be designed as follows:

- round, oval, conical, or elongated base (e.g., base 382, FIG. 38) having a pressure head (e.g., pressure head 381, FIG. 38) at the end near the body;
- the pressure head may be primarily round, but may also be pointed in shape;
- the pressure head may be integrally formed, fixedly connected or interchangeably connected to the base;
- the pressure head can have, at least on the surface, a material with a material property of medium to medium strength (not soft), e.g. (expanded) polypropylene as in a fascia roll (BlackRoll®) but also hard and soft plastic or rubber. Other suitable materials include particle foams made of expanded polypropylene (ePP), expanded thermoplastic polyurethane (eTPU), expanded polylactate (ePLA), expanded polyethylene (ePE), expanded polyethylene block amide (ePEBA) or polyethylene terephthalate (ePET). The hardness and elasticity can be adjusted by mixing these materials.

Figure 38:
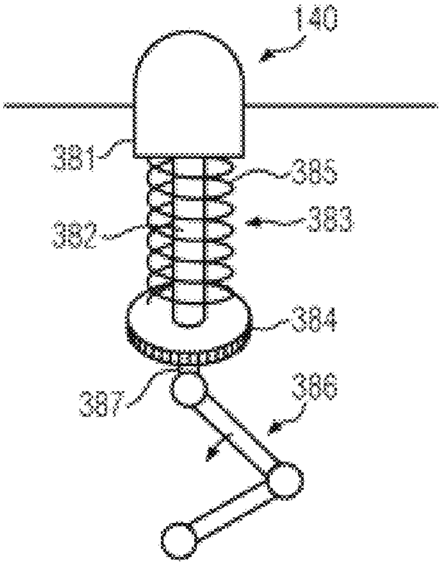
FIG. 38 an example of a pressure element with spring mechanism, which serves for length and pressure strength adjustment and is retractable, according to a further embodiment example of the present invention.

FIG. 38 shows an optional variant of a pressure element 140 with an adjustable spring mechanism 383 for pressure regulation and a folding mechanism 386. The pressure head 381 is displaceably arranged on the base 382 of the pressure element 140. Optionally, a notch or the like may ensure that the pressure head 381 does not fall off the base 382. The spring mechanism includes an abutment 384 attached to a base 382 of the pressure element 140. A spring 385 supports between the pressure head 381 and the abutment 384. A preload of the spring 385 may optionally be adjustable by means of a thread 387 on the base 382. The folding mechanism 386 includes an articulating lever assembly and supports the base of the pressure element 140.

The localization and pressure direction of the pressure units 141 may be selected according to the pressure or pain points known from osteopressure and named below, which may include in particular:

Hip/Pelvis/Spine Region

- Approach M. Psoas at the trochanter minor bds. (on both sides) (a)
- Origin M. rectus femoris at spina iliaca anterior inferior at pelvis (symphysis) bds. (b)
- Origin M. latissimus dorsi at sacrum (c) and at iliac crest bds. (d)
- Origin iliocostalis muscle at iliac crest bds. (e) and at the sacrum bds. (f)
- Origin longissimus thoracis muscle bds. (g) at the sacrum, at the spinous processes and the transverse processes of the lower lumbar vertebrae bds.
- Origin *M. piriformis* bds. at the sacrum (h)
- Origin of multifidus muscle on the sacrum and on the transverse processes and spinous processes of the thoracic and lumbar vertebral bodies (i)
- Origins gluteus maximus muscle at the sacrum (j)
- Origins medius and minimus at the lower edge of the iliac crest (several pressure points each) (k)
- Origin M. tensor fasciae lata bds. at iliac crest and spina iliaca ant. sup. bds. (l)
- Origins M. adductus *brevis*, minimus at pubic bone (m)
- Origins sartorius muscle at spina iliaca ant. sup. bds. (n)
- Origin M. obliquus internus at iliac crest bds. (o)
- Origin transverus abdominis muscle at iliac crest bds. (p)
- Origin obliquus externus muscle on iliac crest bds. (q)
- Origin quadratus lumborum muscle at iliac crest bds. (r)

Chest/Neck Area

Origin and insertion of rectus abdominis muscle at xiphoid (lower edge of sternum), at symphysis bds. and at 5th-7th rib(s)

Origins sternocleidomastoideole at medial clavicle bds. (t) and at sternum bds. (u)

Origin of levator scapulae muscle bds. on scapula (v)

Origin supraspinatus muscle bds. (w)

Approaches of both M. scaleni bds. to the first and second rib bds. (x)

Approaches of the trapezius muscle to the acromion and clavicle bds. (y)

Shoulder Area

Origin of pectoralis major bds. on sternum and clavicle (z)

Origin pectoralis minor muscle bds. to proc. coracoideus bds. (aa)

Origin of short head of biceps brachii muscle bds. to proc. Coracoideus bds. (bb)

Origin deltoid muscle at lateral clavicle bds. and acromion bds. (cc)

Dorsum of the Knee Bds.

Origin of both bellies of gastrocnemius muscle bds. (dd)

Origin of soleus muscle (ee)

Origin and insertion of the biceps femoris muscle (ff)

Front of Leg/Knee Bds.

Origin of M. tibialis ant. bds. (gg)

Approache and origin of semimembranosus muscle bds. (hh)

Approache and origin of semitendinosis muscle bds. (ii)

Approaches of gracilis muscle to medial tibia (jj)

Approache and origin of adductor magnus muscle (kk)

Origin M. Vastus *intermedius* at prox. femur (ll)

Origin of lateral vastus muscle on lat. femur (mm)

Origin of M. Vastus *medialis* on linea *aspera* (nn)

Figure 48D:
FIG. 48D pressure points on the sternum and xiphoid.
Figure 48C:
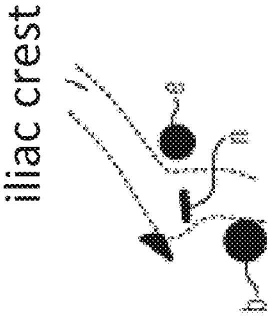
FIG. 48C pressure points on a left spina iliaca anterior superior at the anterior pelvis.
Figure 48B:
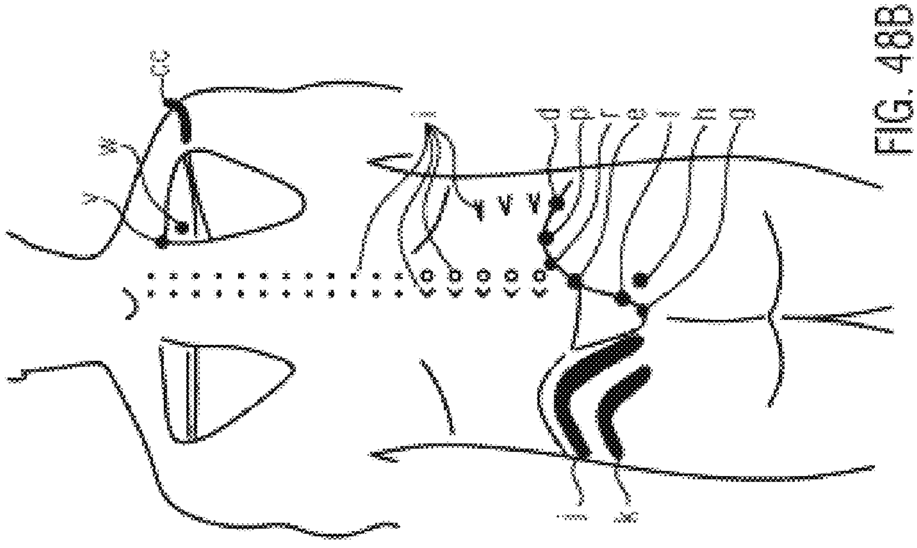
FIG. 48B a human body from behind (dorsal) with marked pressure points.
Figure 48A:
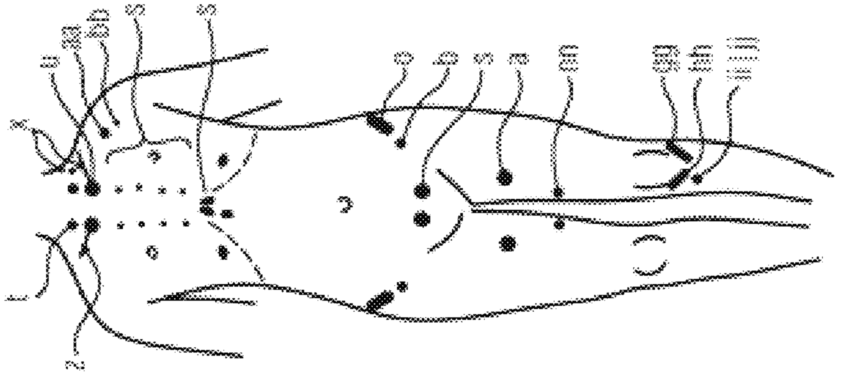
FIG. 48A a human body from the front (ventral) with marked pressure points.
Figure 49:
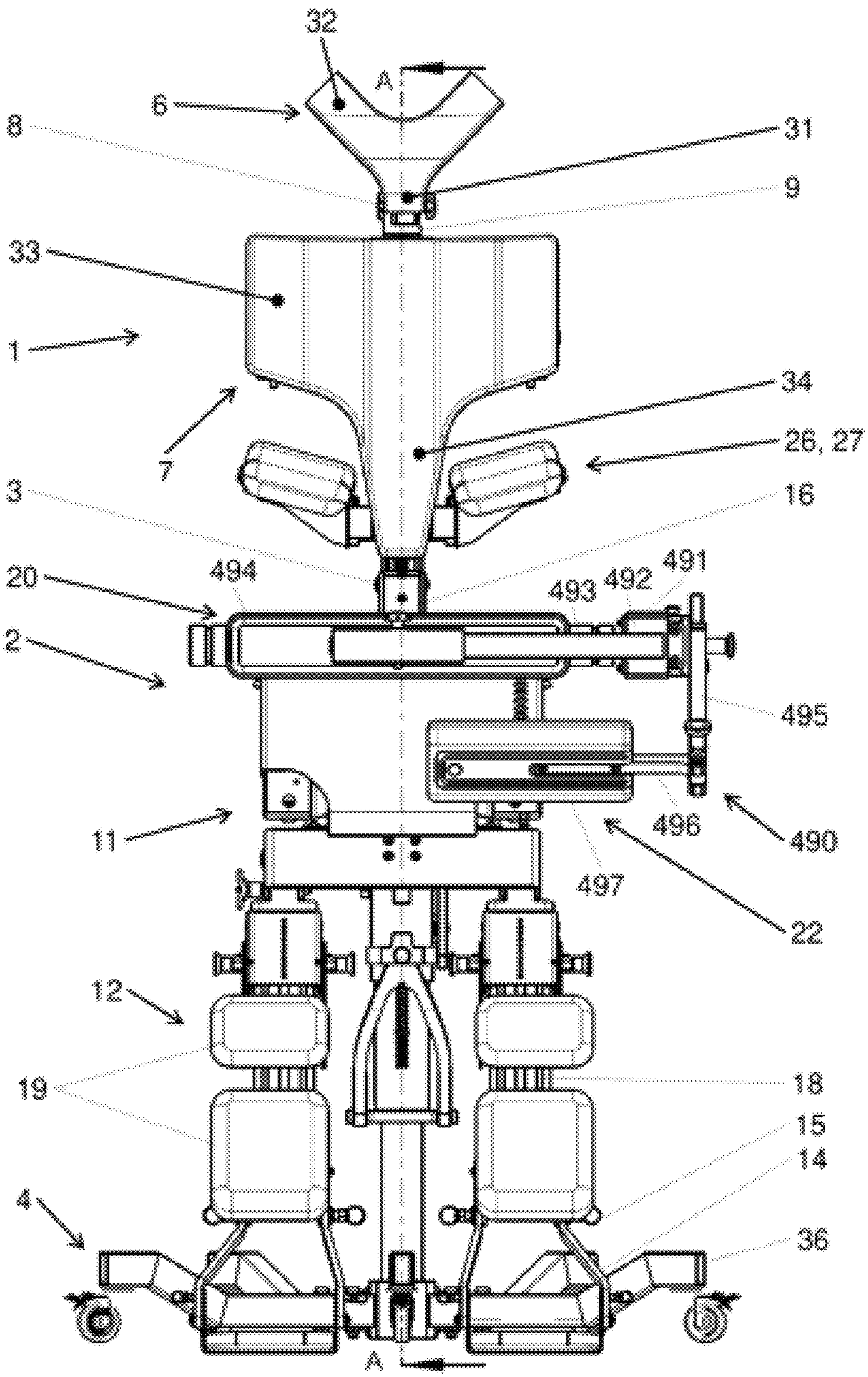
FIGS. 49 to 52 a further embodiment of the chair in different perspective views, and FIGS. 53 to 56 an add-on part with a crossbar of the embodiment shown in FIGS. 49 to 52 in different views.
Figure 50:
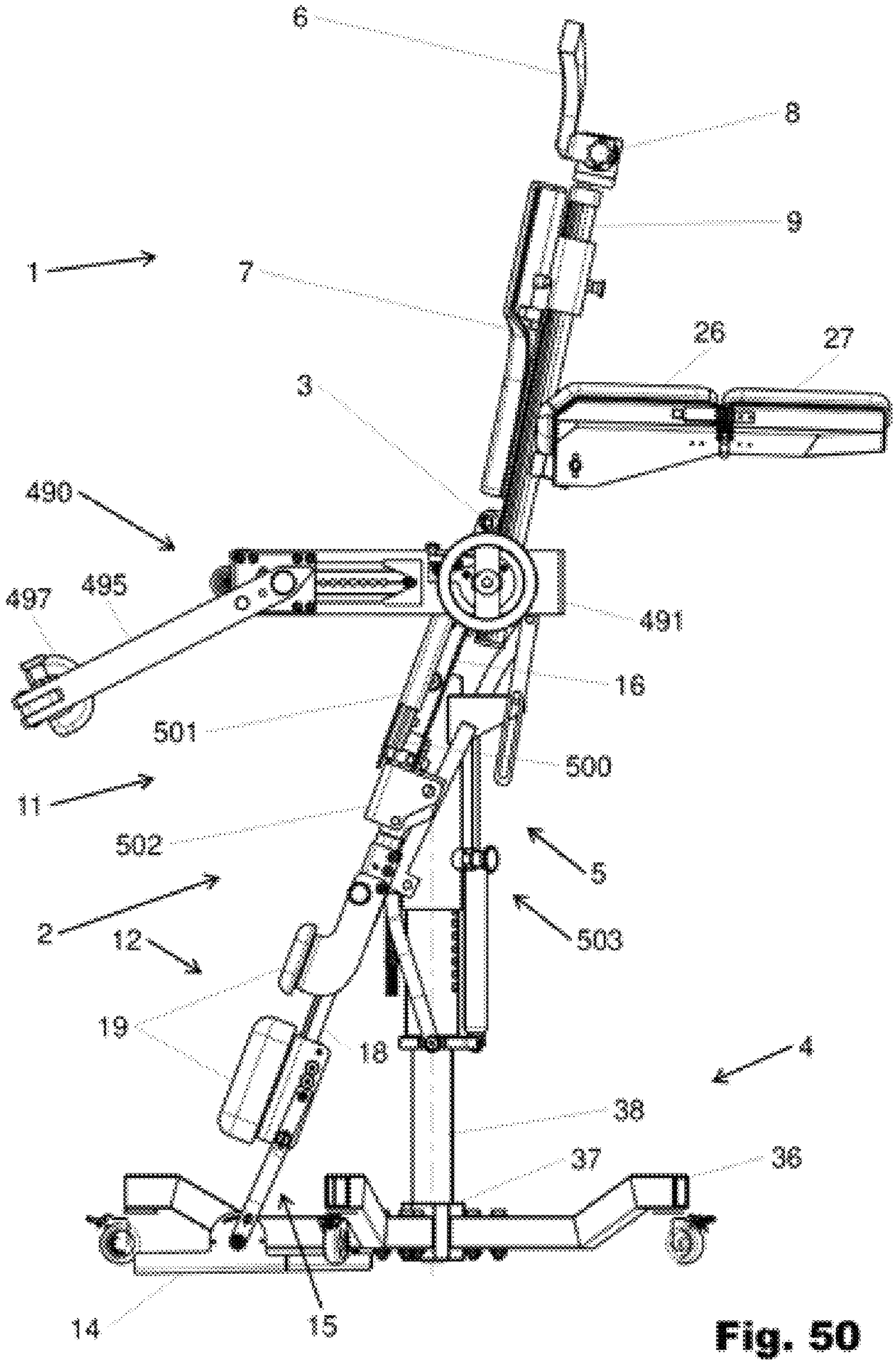
Figure 51:
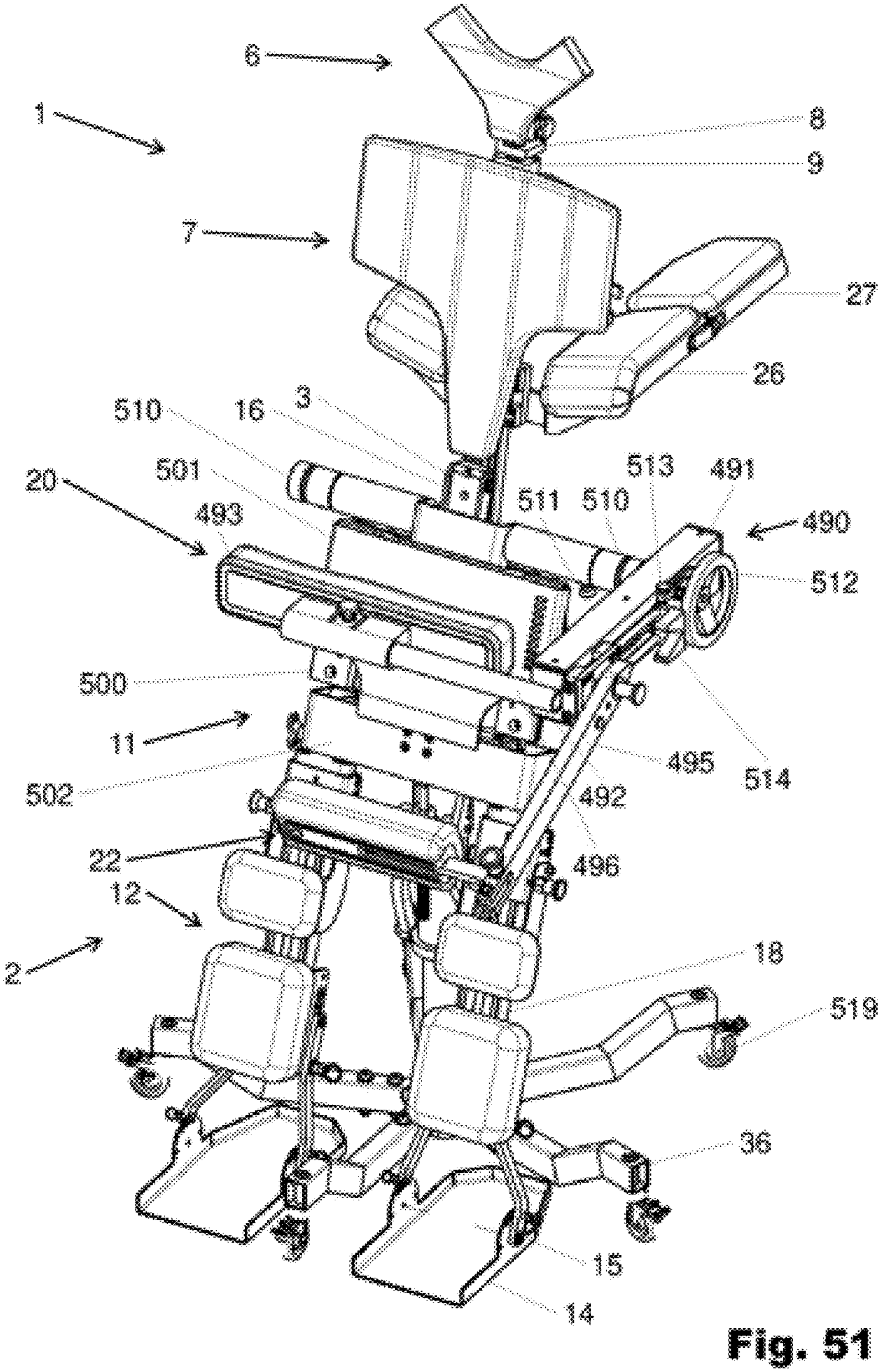
Figure 52:
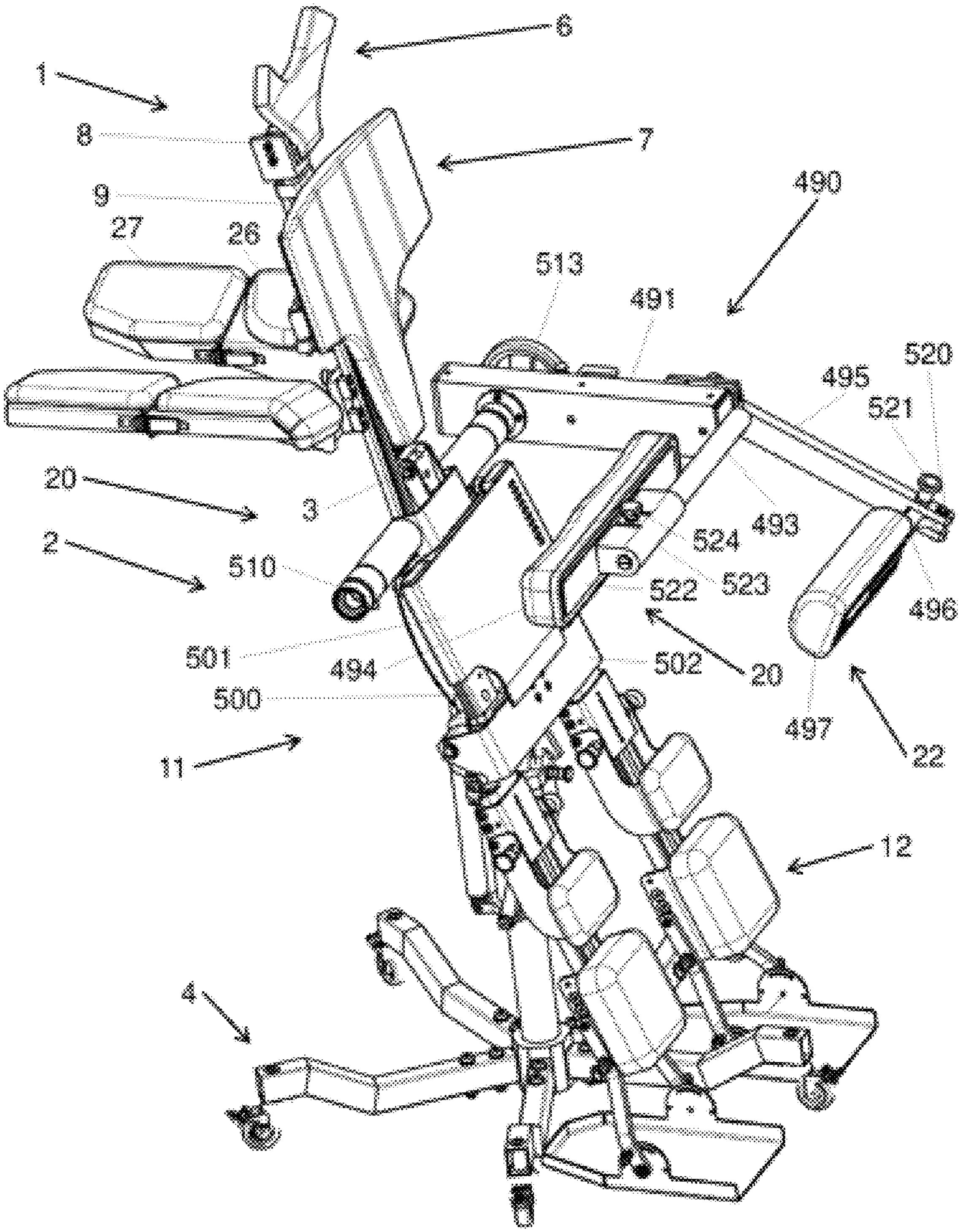
Figure 53:
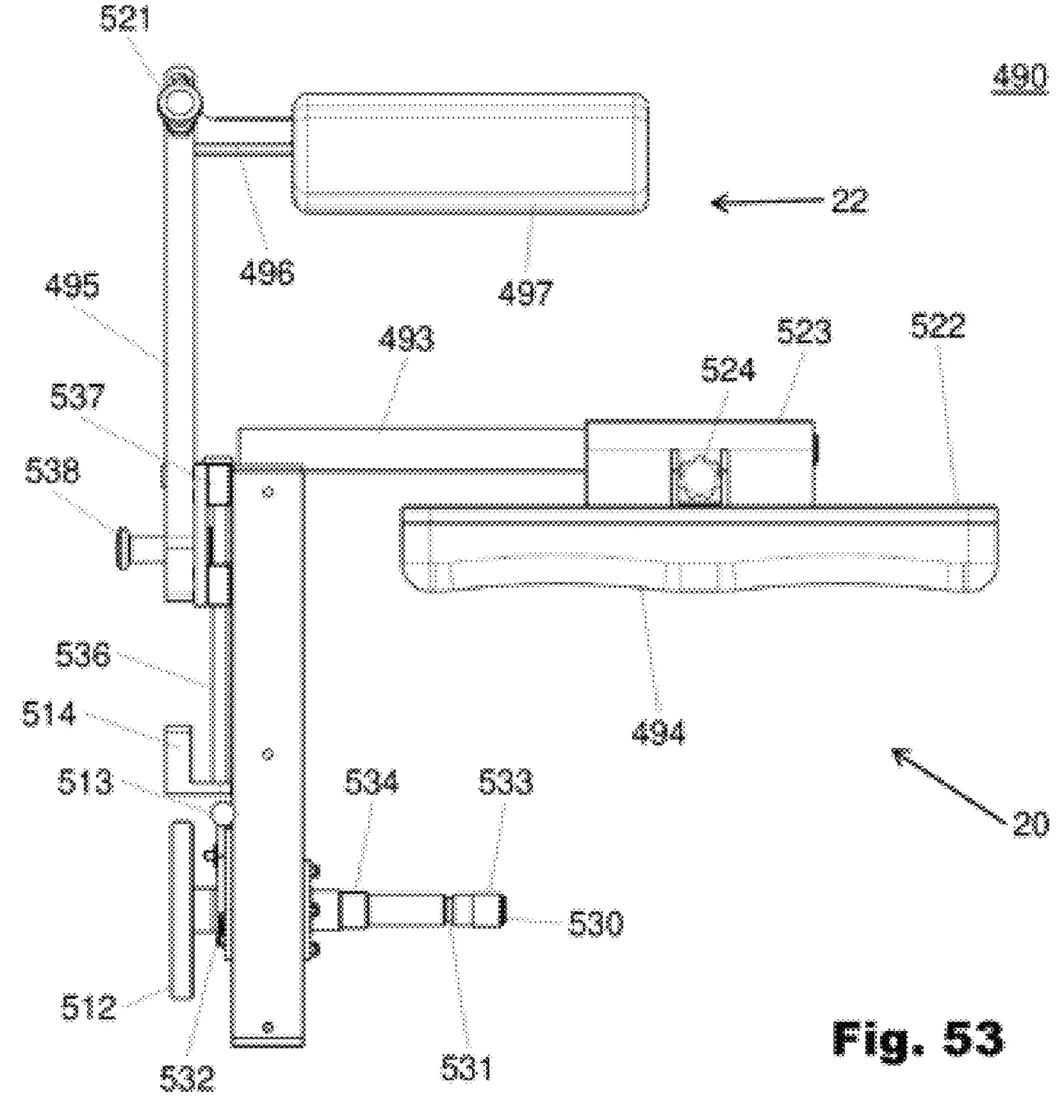
Figure 54:
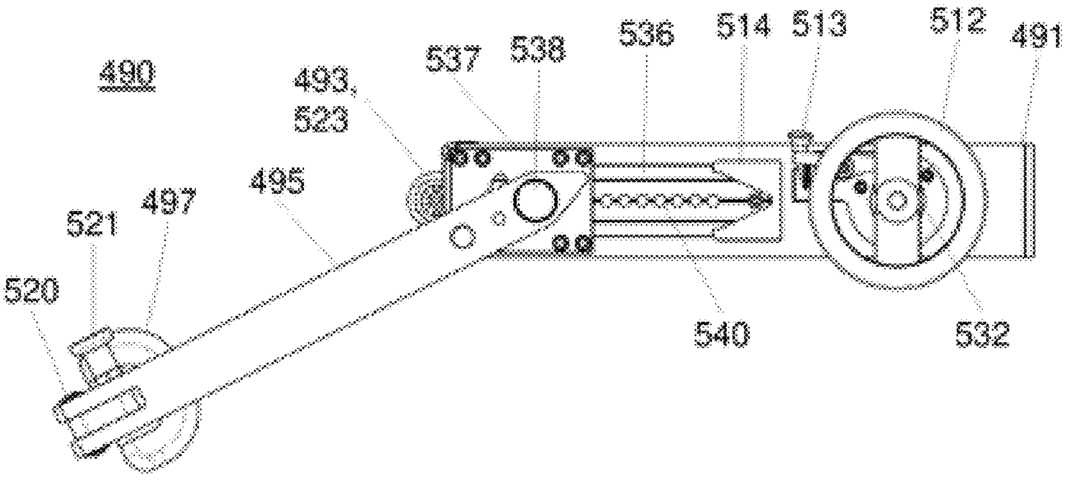
Figure 55:
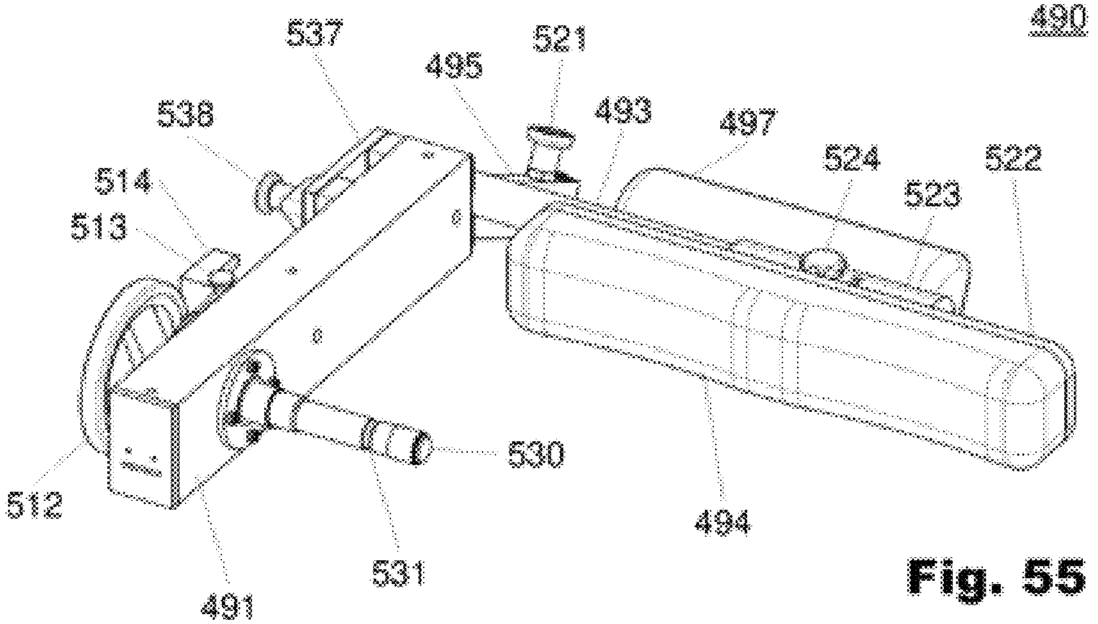
Figure 56:
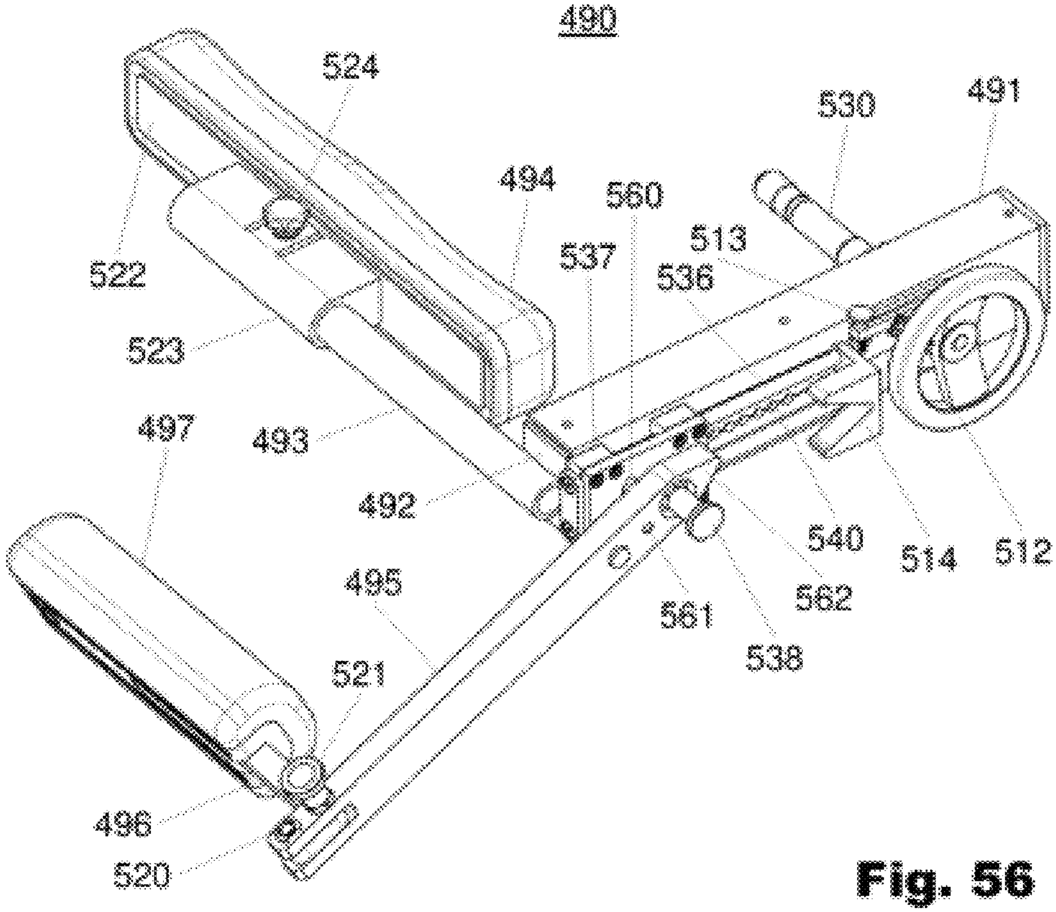

The location of the above listed pressure points a-z, aa-nn is schematically shown in FIGS. 48A-48E, where FIG. 48A shows a front side of the human body, FIG. 48B shows a back side of the human body, FIG. 48C shows a pelvic region with iliac crest of one half of the body, FIG. 48D shows a lower region of the sternum with xiphoid, symphysis and 5th-7th rib of one half of the body, each as cut-out details.

Figure 45:
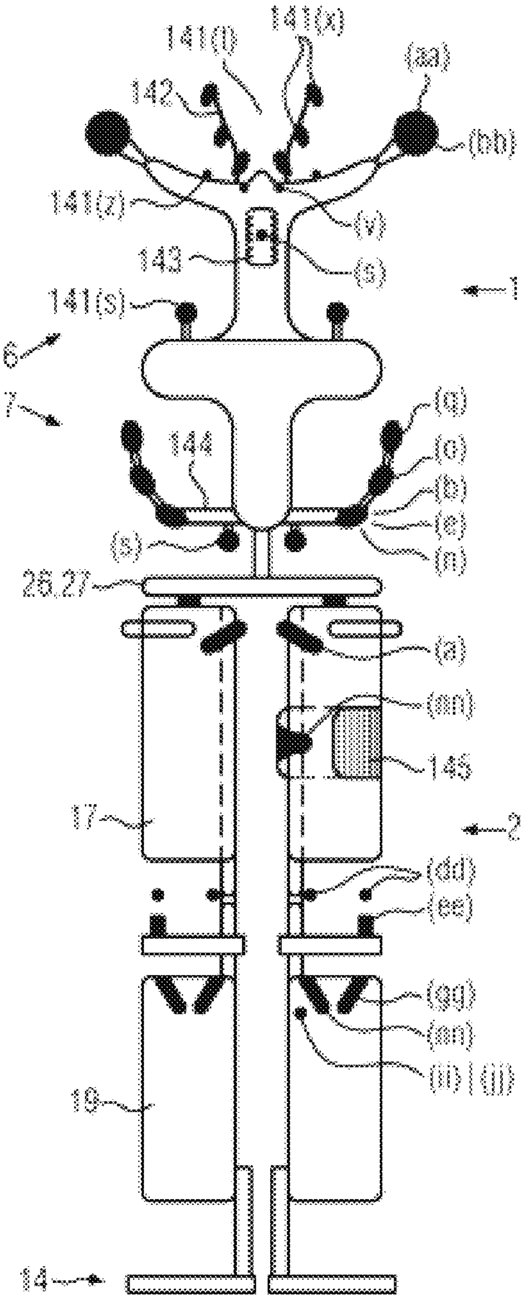
FIG. 45 the chair of FIG. 14 with pressure elements shown in more detail.

FIG. 45 shows the chair according to the invention of FIG. 14 in enlarged view with assignment of the pressure elements 141 to pressure points on the body by the corresponding letter set in brackets according to the above listing and illustration in FIGS. 48A-48E, e.g., 141(*a*) the pressure element for pressure point a, 141(*b*) for pressure point b, etc. Insofar as a letter is shown in brackets in the figure without a further reference numeral, the reference sign 141 for a pressure element must always be read along with it.

In addition to being designed for use in the sense of osteopressure, the pressure units 141 may also be designed and localized for use in the sense of acupressure or massage. When designed for acupressure, the pressure units can, for example, be localized and designed according to the energy points handed down from traditional Chinese medicine (TCM) or acupressure points recognized in Western medicine. When designed for massage, the pressure units can be located and designed according to suitable treatment areas corresponding to a desired massage method.

For example, neck antennas 142 (FIG. 14, FIG. 45) may be attached to the chest support 6, extending around a neck region and including a plurality of pressure units 141. Further, an insert 143 may be recessed into a pad part (shown here for the chest support 6) that includes one or more pressure units 141, wherein the pressure unit(s) 141 may be variable in height by means of a detent scale. Also, a hip bow 144 may be provided that supports pressure units 141. Individual pressure units 141 may be directly attached or clampable to pads 17, 19, 20, 22, 23, 26, 27 or frame members 9, 16, 18, 24, 25 or foldable, rotatable, pivotable or extendable thereon.

Figure 15:
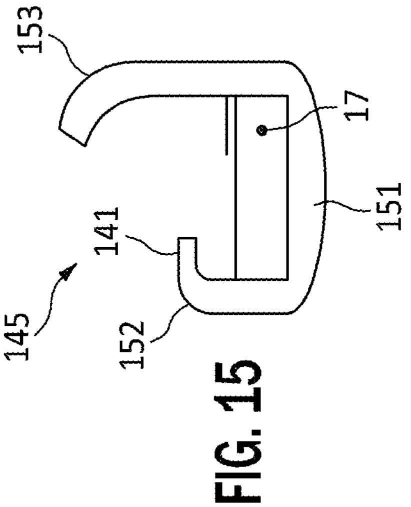
FIG. 15 a cuff of the chair of FIG. 14 in a cross-sectional view.

A sleeve 145 may be placed around a pad, for example 17 or 19, at any of the limb support surfaces, and may also be placed on the leg rest 26 and bear pressure unit 141. The sleeve 145 may include a clamping element 151, which may be clamped to the thigh pad 17 or the frame 131, for example, and may include a holder 152 for a pressure unit 141 to apply a pressure on the inner side of the thigh and a counter-pressure flap 153 to bear against a side of a thigh of the person opposite the pressure unit 141(FIG. 15). The pressure of the pressure unit 141 can be adjustable, particularly in such a way that the distance between the counter-pressure flap 153 and the pressure unit 141 can be changed or the counterpressure flap 153 or the pressure unit 141 can be inserted individually. This can be done, for example, by changing the width of the sleeve, an elasticity of the counterpressure flap 153 or of the holder 152, or an adjusting movement of the holder 152. If the inherent rigidity of the sleeve 145 is not sufficient, a locking device can be provided between the counter-pressure flap 153 and the holder 152 to prevent deflection.

Figure 46:
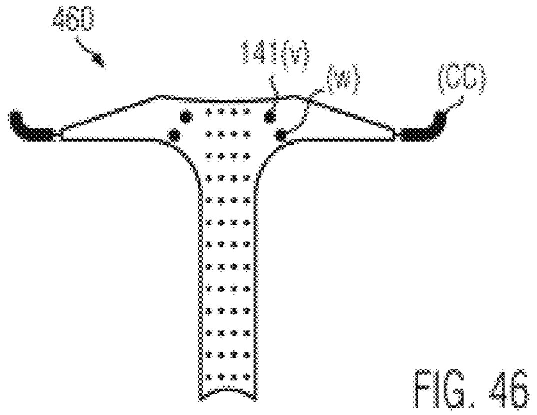
FIG. 46 a thoracic spine support with pressure elements.

A thoracic spine/shoulder module 460 can be provided for the rear shoulder area, which can be attached to or integrated into the back support 23 (FIG. 1), for example (FIG. 46). In addition to pressure units 141, the thoracic spine/shoulder module 460 has nubs 461 that rise in an area of the thoracic spine and can apply a massaging effect, for example.

Figures 47A, 47B, 47C:
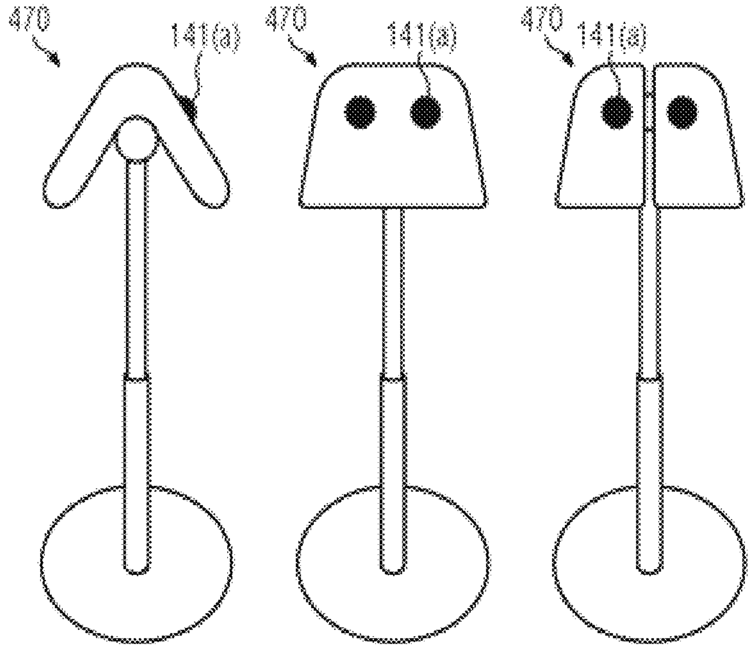
FIG. 47A, 47B a chair according to a further embodiment of the present invention as a step stool in side view and frontal view.
FIG. 47C a chair according to FIG. 47B with a split saddle surface.

FIGS. 47A-47C show a possible location of pressure elements 141 in the surface of a crotch stool 470. The crotch stool 470 is shaped with a roughly saddle-roof-shaped seat surface such that one can sit crotchwise on it, so that one sits on one half of the crotch stool with the lower surface of one thigh and on the other side with the upper surface of the other thigh. The upper body is thus arranged at right angles to a sitting position like on a saddle, i.e., the front surface of the upper body is approximately parallel to the stool ridge of the crotch stool. This results in the hip overextension according to the invention even without counter-bearing elements on the upper body.

The pressure elements are located above the insertion of the psoas muscle at the minor trochanter (141(*a*)). The stool can be rigid or pivotable in the stool ridge, and in the case of a divided seat it can also be pivoted against each other.

The pressure units 141 can act completely passively and are only to be arranged to apply pressure on a defined point of the person's body, whereby it is preferable that each pressure unit 141 acts in a direction in which the person's body finds a counter bearing in the form of a part of the chair according to the invention or a further pressure unit 141. Optionally, pressure units 141 may also be designed to be active, for example by applying a feed motion, vibration, pulsation, rotation, rolling or flexing, or by imparting electrical charges, magnetic or electromagnetic fields, heat or cold. An infeed motion can be useful for accommodating individual body dimensions and/or for sizing the pressure applied. In particular, when designed with acupressure treatment in mind, targeted heating or cooling of the pressure points can be used.

Optionally, the pressure units 141 can be adjustable in pressure strength, e.g. via an adjustable spring mechanism or motorized. For this purpose, a force sensor can be provided at the respective pressure units 141, the output signal of which is fed to a control and/or control display. In a control system, the individual pressure units 141 can be controlled in accordance with a manually specified pressure value or a pressure value determined by an algorithm, if necessary in compliance with predetermined threshold values. Furthermore, it is also optionally possible to control the time at which the pressure is applied.

Furthermore, it is possible to fold away or retract the pressure units individually or combined in modules so that they do not apply any further pressure. In the case of a control system, an emergency stop function can also be provided.

Figure 17:
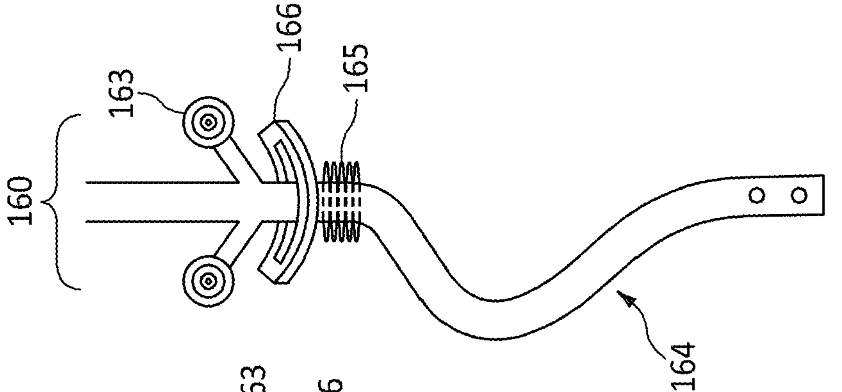
FIG. 17 the head module of FIG. 16 in a front view.
Figure 16:
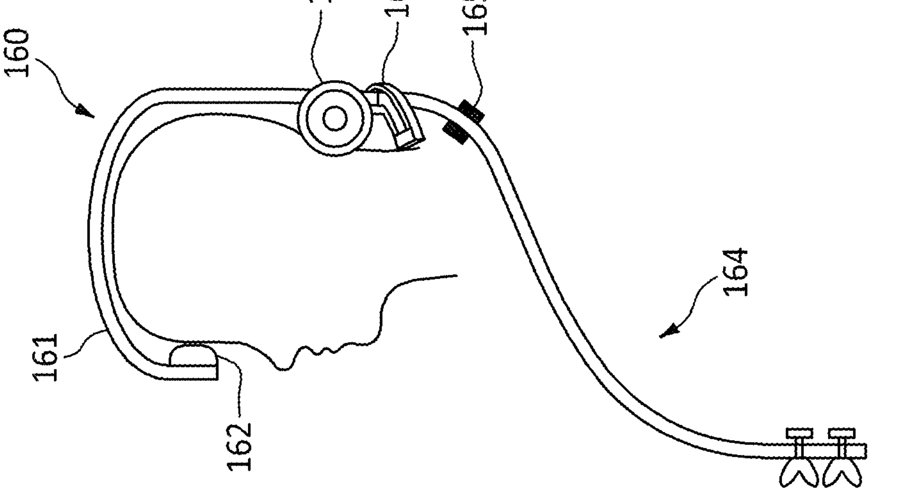
FIG. 16 a head module for attachment to the chair in a side view.
Figure 19:
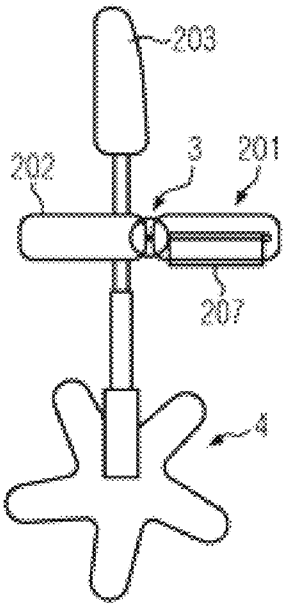
FIG. 19 a chair (variant 2) according to a further embodiment of the present invention in a side view in a first position.
Figure 20:
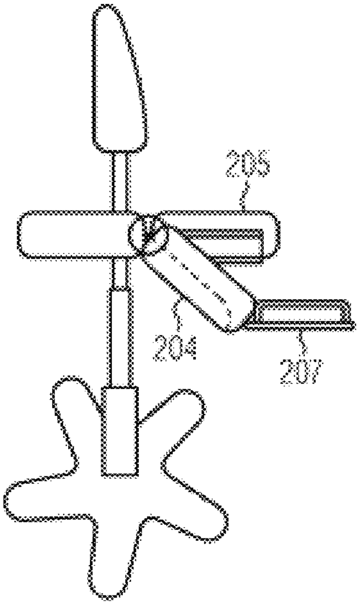
FIG. 20 the chair of FIG. 19 in a second position.
Figure 21:
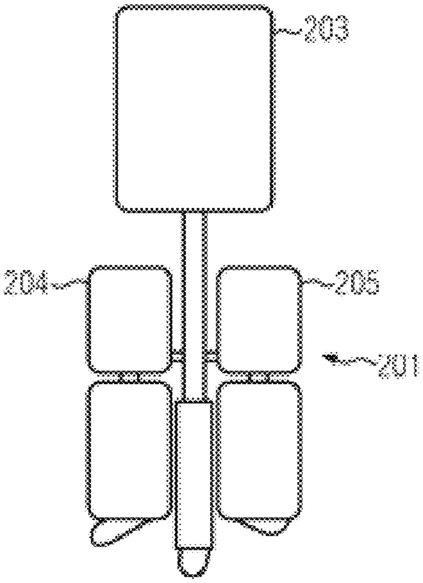
FIG. 21 a chair of FIG. 19 according to a further embodiment of the present invention in a rear view with continuous abdominal support.

Another optional addition to the chair of the invention relates to a head module 160 (FIGS. 16, 17). The head module 160 has a bow 161, a forehead pad 162 at one end of the bow 161, and two neck pads 163 at another end of the bow 161. Two neck pads 163 are attached to the lower part of the bow 161 via two side bars (previously known from old dentist's chairs). The neck pads 163 lie in the area of the mastoid bds. on the skull. When in use, the neck pads 163 support the skull from behind and apply a slight upward pressure, thereby slightly stretching the posterior muscles of the cervical spine. The forehead pad 162 acts as a counter support. This can provide significant relief to the neck muscles. An attachment 164 is provided for attaching the head module 160 to a part of the chair according to the invention. The head module 160 has a spring and extension mechanism 165 that permits forward, rearward and lateral movement of the head. In addition, the spring mechanism causes the neck to be extended.

This head module 160 represents a separate inventive concept that can be used independently of the chair explained above, with or without the front end of the bow 161 that supports the forehead pad. In particular, it helps to counteract excessive stress on the neck.

The attachment 164 may further be formed with a part of the chair via a pivoting-sliding mechanism 166 that includes a curved rail, slides along the bow 160, and simultaneously rotates to provide an axis of rotation of the head approximately at the dens axis and cervical spine. The rail may be arranged with a separate support, wherein the bow 160 is formed integrally with the attachment 164 and is guided along the rail.

The pivoting-sliding mechanism may comprise a single plane or, for improved stability, multiple planes.

As a further addition, massage devices may be implemented in all or selected padding elements of the chair according to the invention. Further, all or selected padding of the chair of the invention may include texturing that provides a passive massaging effect.

Figure 18:
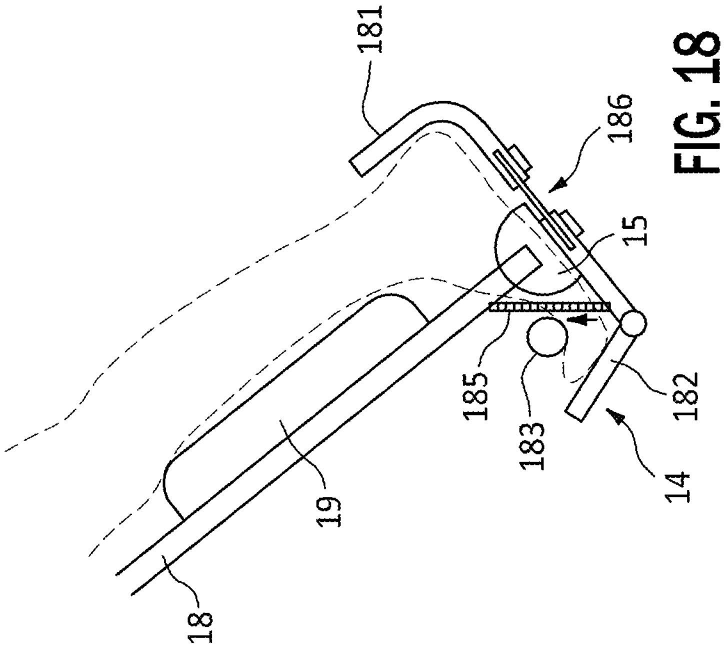
FIG. 18 a modified footrest of the chair of FIG. 1.

Another optional addition relates to the foot support 14. In previous embodiments, the foot support 14 is designed as a simple plate, which is adjustable to stretch the calf muscles. This adjustment can be further enhanced by a spring mechanism 185. The foot support can accommodate pressure mats, which are available from various manufacturers on the market (e.g. Kybun® mat or Aeris® muvmat etc.) According to the supplement, the foot support can have a heel stop or heel pad 181, an upwardly adjustable toe stop 182 and a hold-down device 183 (FIG. 18). In a simple design, the hold-down device 183 can also be designed as a strap or band, and in a more complex design as a movable and lockable pressure part, optionally with a pad. This can be used to achieve a foot position with the toes raised, resulting in stretching of the toe flexor muscles with associated tendons, ligaments and fascia. The foot support 14 can optionally be designed to be telescopic by means of an adjustment mechanism 186, in order to be able to adapt it to different foot lengths.

Figure 22:
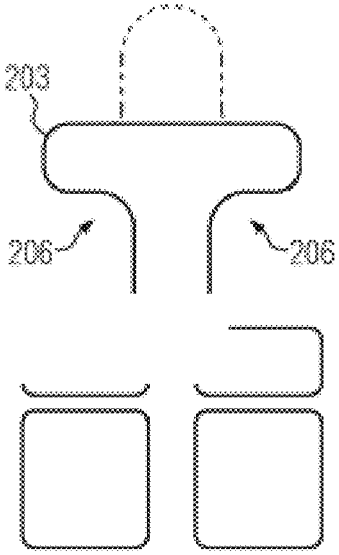
FIG. 22 a chair of FIG. 19 according to a further embodiment of the present invention in a rear view with waisted abdominal support.
Figure 23:
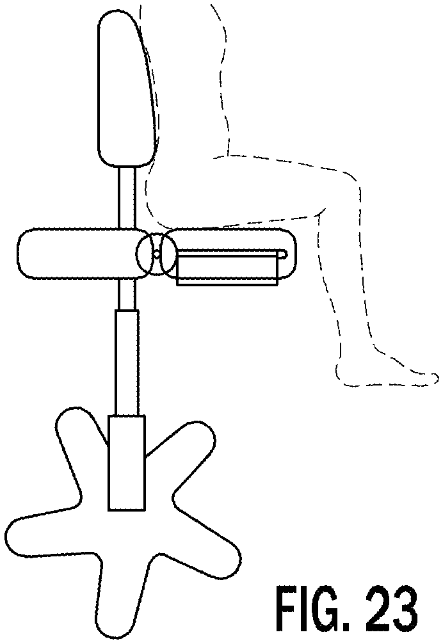
FIG. 23 the chair of FIG. 19 in a practical application in an usual sitting position.
Figure 24:
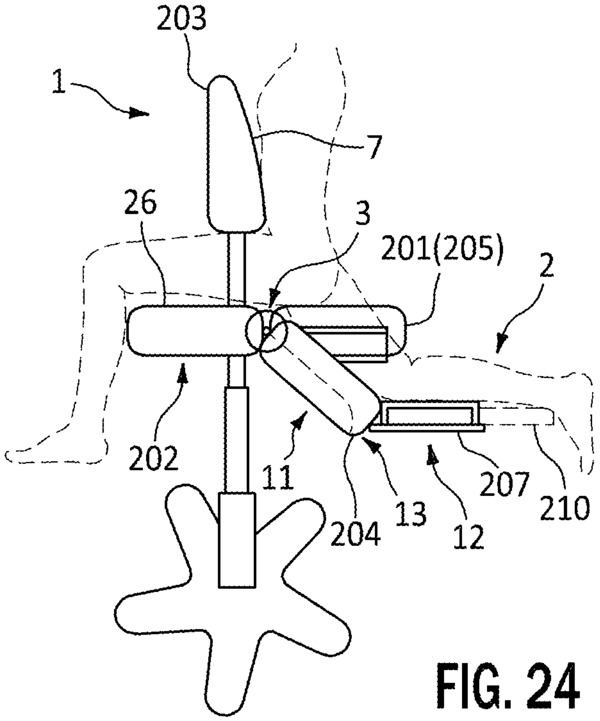
FIG. 24 the chair of FIG. 19 in another practical application.

In FIGS. 19 to 24, a simple variant (variant 2) of the chair according to the invention is shown. Here, a large part of the optional functions is dispensed with. In its basic design, the chair can be used like a normal office chair (FIG. 23). In accordance with the invention, however, this variant also has the option of hyperextension of the hip (FIG. 24).

Variant 2 comprises a chair that has a seat surface 201 with a seat surface extension 202 that projects backward beyond a backrest 203. Via the central joint 3, seat surface halves 204, 205 of the seat surface 201, which is divided laterally into two parts, can each be individually folded downwards in a variably adjustable manner and fixed, optionally also spread apart. A further bearing element 207 for the lower leg can be folded out of the seat surface 201 and can also be fixed and spread apart. An additional extension or a clip-on or fold-out extension 210 can be provided (FIG. 24). In use according to the invention, the person sits astride the seat surface 201 or a seat surface half 204 left in a horizontal position, and the backrest 203 serves as an abdominal support 7. One thigh projects under the backrest 203 (abdominal support 7) and rests on the seat surface extension 202, which now serves as a leg rest 26. The other leg rests with the front of the thigh on the seat surface half 204, which is lowered downwards at an angle and thus serves as a thigh support 11 and forms part of a lower body section with a lower body contact surface in the sense of the invention. As a result, this leg is hyperextended backwards at the hip. In this case, the lower leg rests on the unfolded bearing element 207 with the optionally extended, clipped-on or folded-out extension 201. The bearing element 207 with the extension 210 thus serves as lower leg support 12. The backrest 203 serving as abdominal support 7 can be continuous (FIG. 21) or have recesses 206 formed for forward support of the legs (FIG. 22). Alternatively, this part can also be designed as in the first design example (FIGS. 1, 2).

Figure 25:
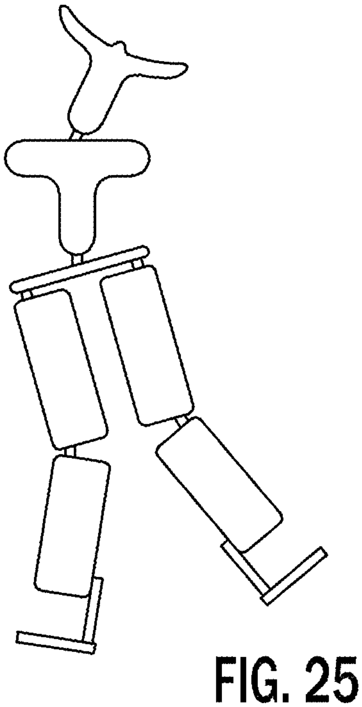
FIG. 25 a chair according to a further embodiment of the present invention in a front view in a position with rotations and spreading.
Figure 26:
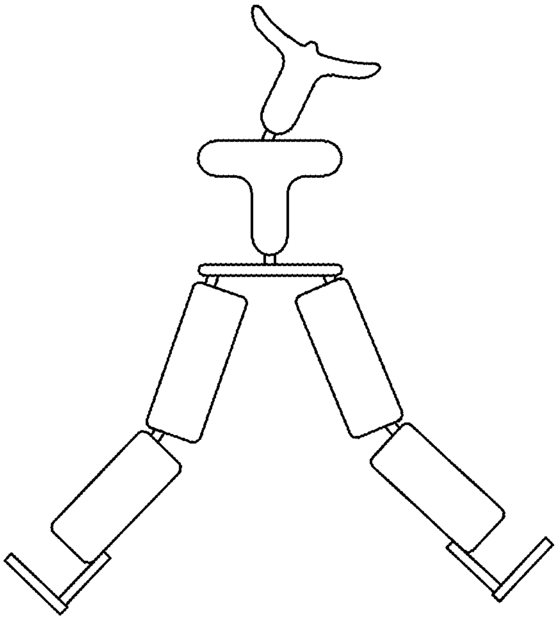
FIG. 26 a chair according to a further embodiment of the present invention in a front view in a position with rotations and spreadings and torsions.

FIGS. 25 and 26 show various optional options for bracing, rotation and torsion of the chair according to the invention, e.g. of FIG. 1, in various positions.

Figure 27:
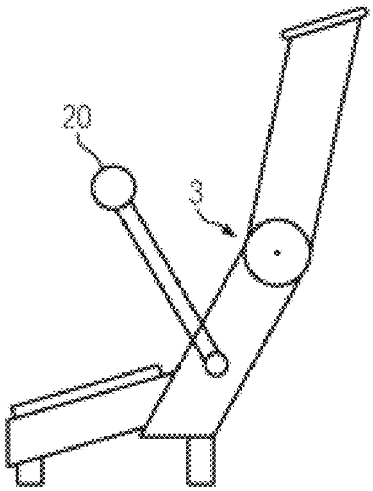
FIG. 27 a chair (variant 3) according to a further embodiment of the present invention in the form of a knee bench in a side view.

FIG. 27 shows a chair according to the invention in the form of a knee bench with hip counter-bearing element 20 (variant 3), which also has the hip hyperextension according to the invention.

Figure 28:
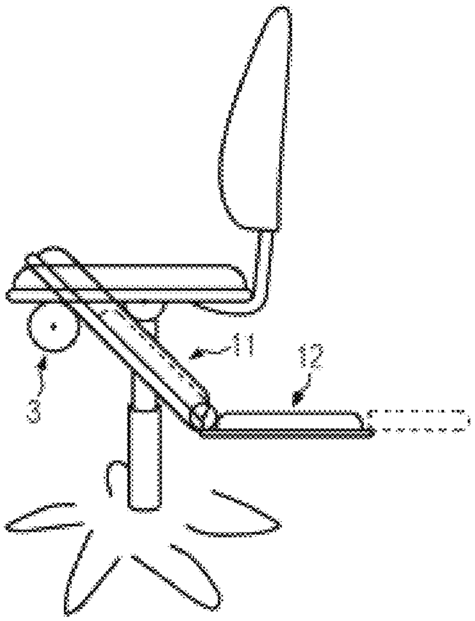
FIG. 28 a chair (variant 4) according to a further embodiment of the present invention in a side view with a thigh support/seat surface that can be folded back.

FIG. 28 shows a chair (variant 4) in which the seat can be lowered backwards on one side. This means that even in the normal seat, one leg can be extended backwards at the hip and rest on the lowered part. The mechanism otherwise corresponds to variant 2. The central joint 3 is mounted on a frame (not shown in more detail) and can also be designed to brace and rotate.

Figure 29:
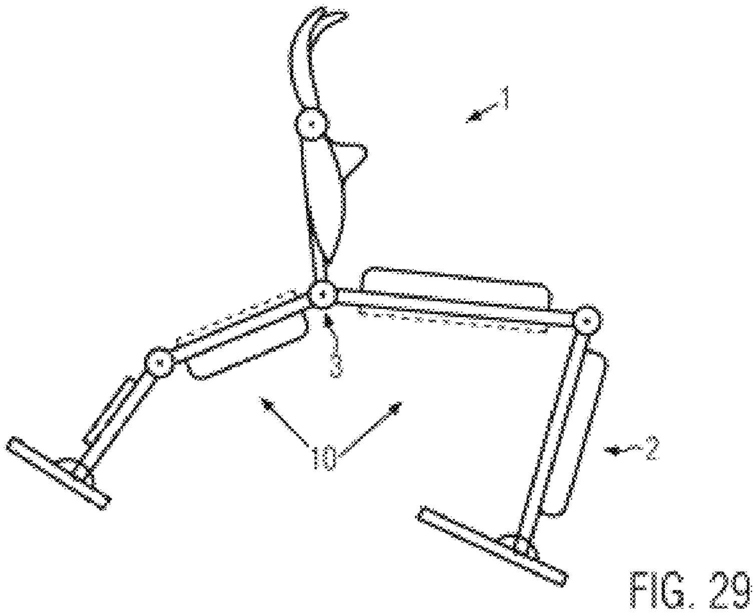
FIG. 29 the chair of FIG. 1 in another position or practical application.

FIG. 29 shows a possible application of the chair according to the invention, e.g. of FIG. 1, with a pivoting central joint 3 and lower intermediate joint 13. This position can also allow unilateral hyperextension of the hip joint when used as an office chair.

Figure 30:
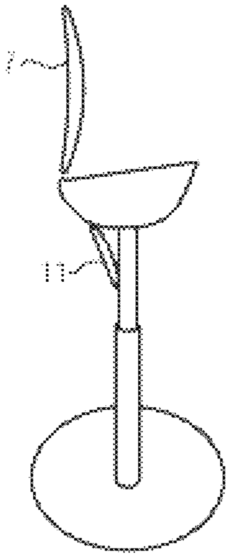
FIG. 30 a chair (variant 5) according to a further embodiment of the present invention in the form of a saddle stool in a side view.

FIG. 30 shows a chair according to the invention (variant 5) in the form of a saddle stool with abdominal support 7 and height adjustment and a thigh support 11, which allows the hip to be hyperextended according to the invention.

Figure 31:
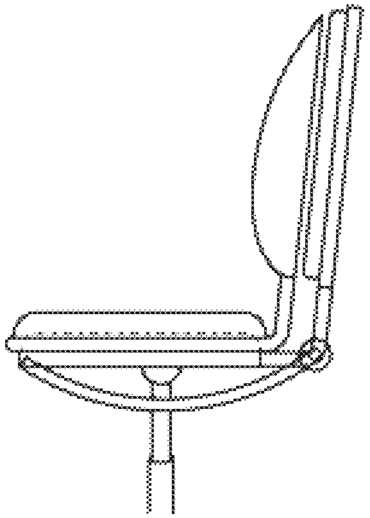
FIG. 31 a chair (variant 6) with a swing-through backrest and a seat surface/thigh support which can be folded downwards, according to a further embodiment of the present invention, in a side view in a first position.
Figure 32:
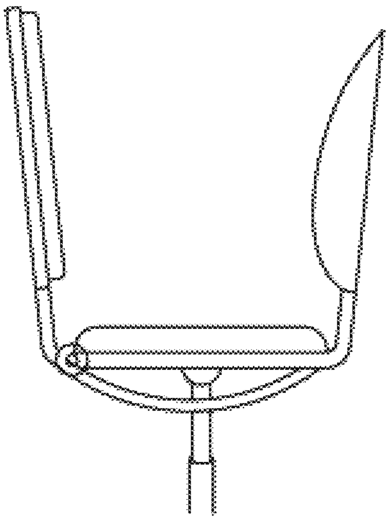
FIG. 32 the chair (variant 6) of FIG. 31 in a second position.
Figure 33:
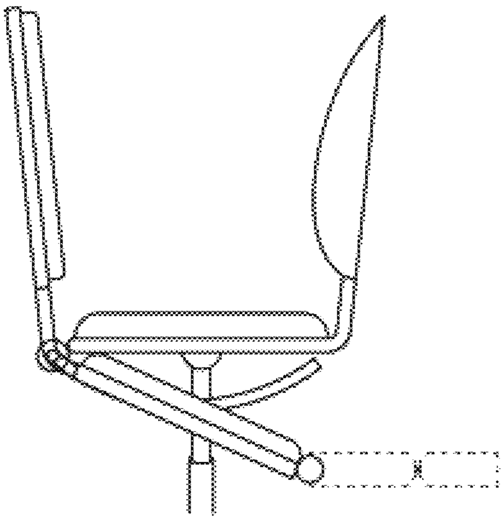
FIG. 33 the chair (variant 6) of FIG. 31 in a third position.
Figure 34B:
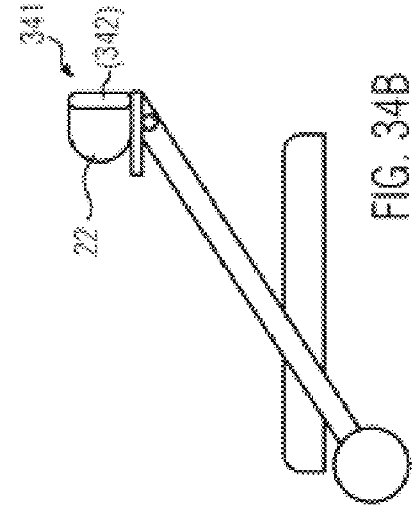
FIGS. 34A-34E an arm support for a chair according to a further embodiment of the present invention.
Figure 34E:
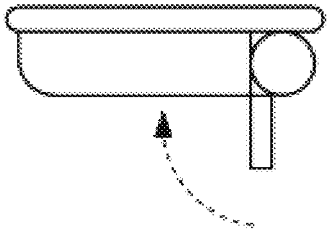
Figure 34D:
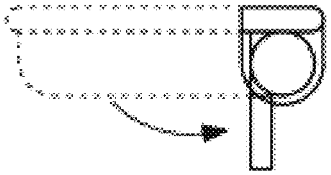
Figure 34A:
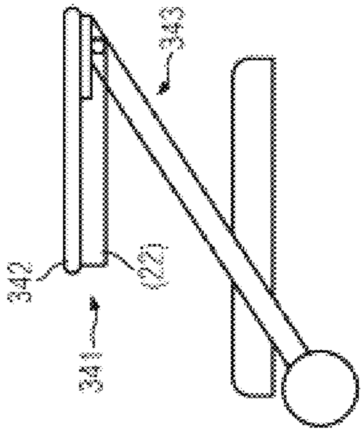
Figure 34C:
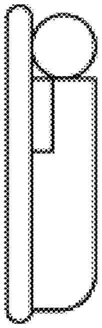

FIGS. 31-33 show a variant (variant 6) in which the backrest becomes the thigh support and the seat surface becomes the abdominal support. A variant of this in turn (FIG. 33) has a lower leg support that can be folded out once or several times.

FIGS. 34A-34E show one possible embodiment of an arm support 341 that can be converted from a functional position as an arm rest 342 (FIG. 34A) to a function as a foot roller 22 (cf. also FIG. 1) via a folding/pivoting mechanism 343.

FIG. 35 shows the chair in variant 1 according to FIG. 1 in a further embodiment of the invention with a further frame option. The functionality corresponds in large parts to that shown in FIGS. 1-12. The base pivot joint is broken down into a first base pivot joint 351, a second base pivot joint 352 and the central joint 3. The first base pivot joint 351 attaches to the piston 39 of the gas cylinder 38 of the standing base 4 and is connected via a first strut 353, which can be pivoted relative to the piston 39 in the first base pivot joint 351, to the second base pivot joint 352, and the second base pivot joint 352 is connected to the central joint 3 via a second strut 354, which can be pivoted relative to the first strut 353 in the second base pivot joint 352. The rocker 9 of the abdominal support 7 is hinged to the central joint 3 as described. Furthermore, the thigh bar 16 of the thigh support 11 is also hinged at the central joint 3. An auxiliary strut 357 may also be hinged or fixed to the supporting joint 356, which ends in a supporting joint 356. A telescoping bar 355 may extend between the supporting joint 356 and another joint 359 on the thigh bar 16. This allows the inclination of the thigh support 11 to be adjusted without having to loosen the pivot joints 351, 352 or the central joint 3. An auxiliary rocker 358 is supported on the central joint 3 and can optionally also be pivotably articulated in the latter. The foot rest 25 and the leg rest 26 can be hinged to the auxiliary rocker 358 so that they can be folded horizontally for use and vertically when not in use. All joints may be releasable and lockable as described. This frame option is shown in the figure without a lower leg section, but such a section may of course be present as well as other elements described (optionally removable and assumed to be removed in the figure) such as a hip counter support element, foot roller, back support, knee support, etc.

FIG. 36 shows the chair in variant 1 according to FIG. 1 with a further frame option, the folded lower leg support 12 and folded leg rest 26 with foot rest 25 and a head rest 361. The mode of operation corresponds in large parts to that shown in FIG. 1-12 or 35.

FIG. 37 shows an optional folding mechanism 371 which can be used particularly advantageously on a chair according to the invention designed as an office chair and improves the stability of the chair according to the invention. Preferably, the chair is arranged in such a way that the folding mechanism 371 automatically folds out when a prone position of the chair (FIG. 1 and others) is set, and allows a wide support on the floor. For use, the gas spring must be at the top in this example. Other variants are also conceivable. For example, the struts of the standing base 4 can be lengthened and optionally extended automatically when a prone position of the chair is set.

Figure 39:
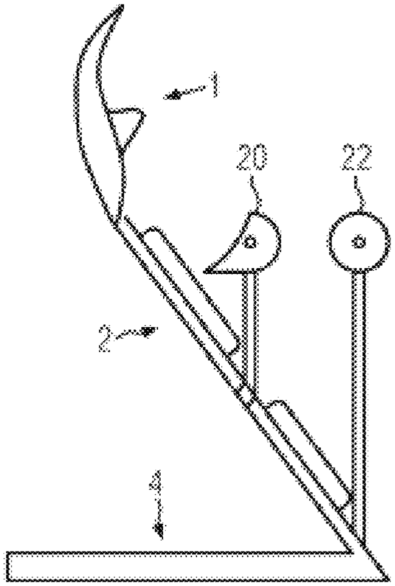
FIG. 39 a chair according to a further embodiment of the present invention in a side view as a stand variant.

FIG. 39 shows a chair according to a further embodiment of the invention in the form of a stand variant, in which the upper body section 1 and the lower body section 2 are connected to each other as a rigid frame with a standing base 4, which is also rigidly connected, and which is also equipped with hip counter-bearing element 20 and foot roller 22.

Figure 40:
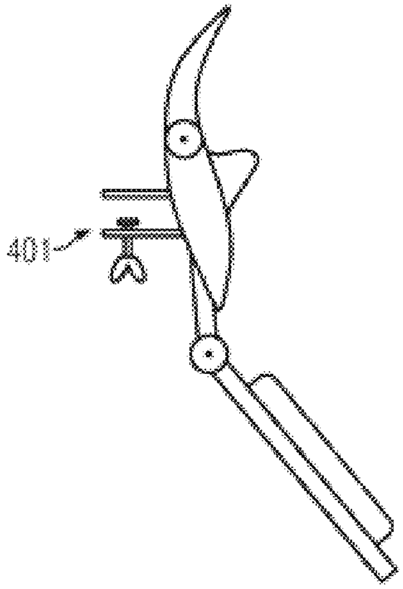
FIG. 40 a chair according to a further embodiment of the present invention in a side view as a table screw-on variant.
Figure 41A:
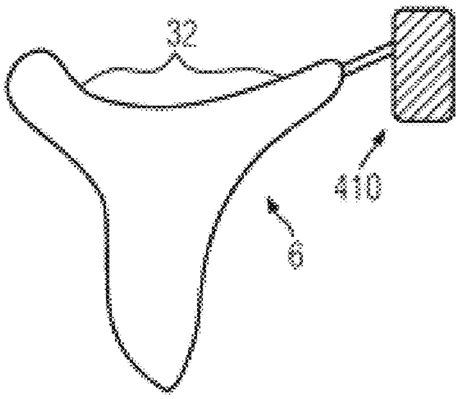
FIG. 41A-41D a shoulder module for a chair according to a further embodiment of the present invention, which in various forms presses the shoulder backwards while allowing free movement of the arm.
Figure 41B:
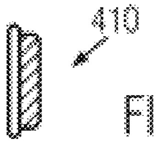
Figure 41C:
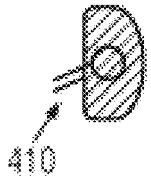
Figure 41D:
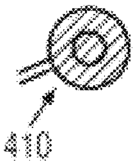

FIG. 40 shows a tabletop screw-on version with a screw clamp 401.

FIGS. 41A to 41D show three variants of a shoulder module 410 in different views. The module is to be attached to the side wings 32 of the chest support 6, may be telescopic, and may be mounted on a ball, for example, to allow shoulder mobility within a range of motion for normal office activities. The shoulder module can be designed to fold down.

Figure 42A:
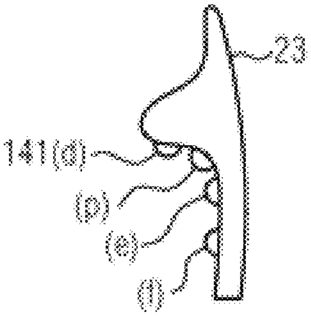
FIGS. 42A-42C a back support for the chair according to a further embodiment of the present invention, in each case in side view, front view and top view.
Figure 42B:
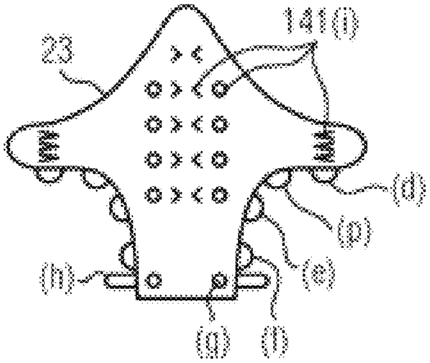
Figure 42C:
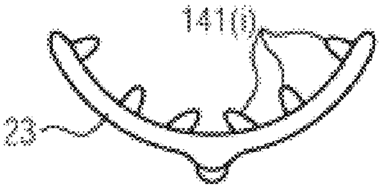

FIGS. 42A to 42C show the back support 23 of FIG. 1 in a variant with pressure units 141 in side view, front view and top view. The pressure units 141 are shown in the figure with the associated pressure point on the body according to the foregoing listing and illustration in FIGS. 48A-48E by the corresponding letter in parentheses, e.g., 141(*d*) the pressure element for pressure point d, 141(*i*) for pressure point i, etc. Insofar as a letter in brackets is shown in the figure without a further reference numeral, the reference sign 141 for a pressure unit must always be read along with it. The back support 23 can be used with or without pressure units 141. The pressure units 141 press on attachment points of the back muscles. With pressure units 141, pressure can only be applied to the back for a limited time, usually about 5 minutes per day. A variant is a back support without pressure units.

Figure 43A:
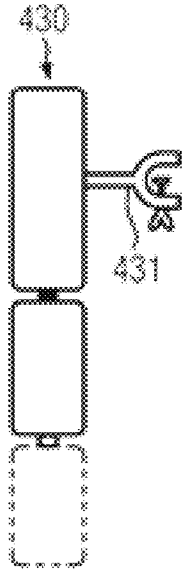
FIGS. 43A, 43B a chair according to a further embodiment of the present invention as an attachment variant to a normal chair/office chair in front view and side view.
Figure 43B:
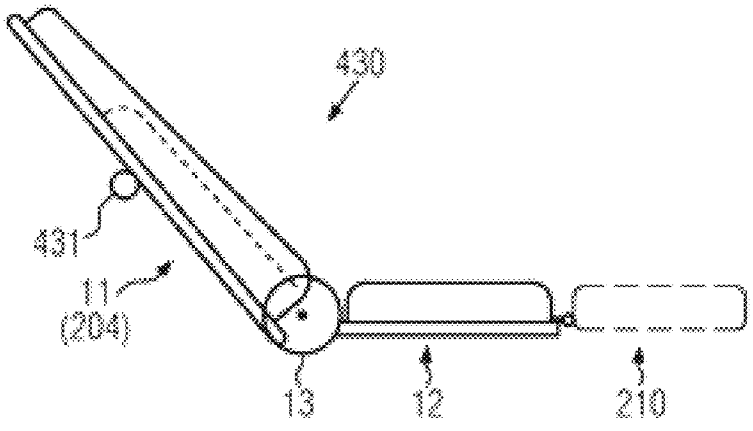

FIGS. 43A and 43B show a chair element 430 according to the invention as an attachment variant in two views. The chair element 430 corresponds to the lower body section 2 of the first and third variants with a thigh support 11 (204) and a lower leg support 12 (207) and a lower intermediate joint 13. An extension 210 can optionally also be provided on the lower leg support 12.

The chair element 430 has a screw clamp 431 arranged laterally on the thigh support, with which the chair element can be fastened to a conventional chair, in particular to the chair leg thereof, in order to be able to effect a hyperextension of the hip. The attachment can also be realized in other ways.

The chair element 430 forms an independent invention.

Figure 44:
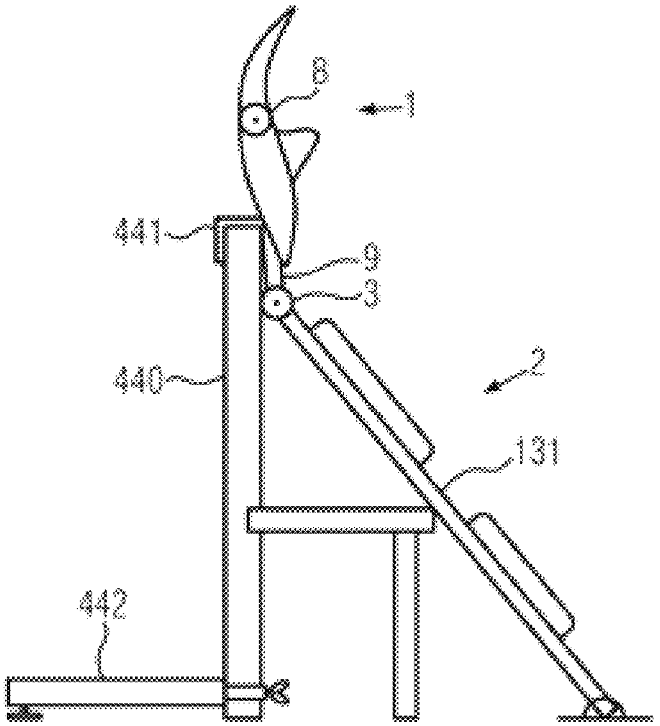
FIG. 44 a chair according to a further embodiment of the present invention as a chair attachment variant with tilt safety device.

FIG. 44 shows a variation of the chair according to the invention as a chair attachment variant to be attached to another piece of seating furniture 440. For this purpose, the chair of this variation has a hook-in device 441. The attachment can also be realized in other ways. To improve stability, a tilt safety device 442 is optionally provided, which can be mounted on the seat furniture. Instead of a piece of seating furniture, this variant can also be attached to other objects such as a railing, a balustrade, a window frame. For example, the invention can also be used for observation or surveillance situations with their often long periods of sitting or standing.

The thigh support or seating surface may also be transversely divided, meaning in a direction parallel to axes of the central joint 3 or the base pivot joint 5 or the intermediate joint 13. Such a transverse division may be advantageous for stowing the hip counter bearing element 20 when not in use.

A further embodiment example is explained below, in which identical parts are marked with the same reference signs and the explanations explained above apply equally, unless otherwise stated below (FIGS. 49 to 56).

In this further embodiment, the base pivot joint 5 is realized by a parallel link arrangement. Such a parallel link arrangement has already been explained above.

In the embodiment, the thigh support 11 (thigh bar 16) can be pivoted as a whole and the lower leg support 12 can be pivoted laterally. It can also be designed to extend in the axial direction or to pivot axially in the lower intermediate joint 13. The lower intermediate joint is located under the front seat surface.

The hip counter bearing 20 and the foot roller 22 can be realized in an attachment part 490 FIGS. 53 to 56). The attachment part 490 can be attachable on the left or right side, for this purpose two pivot bearings 510 are provided, which are attached to the thigh bar 16 or to the central joint 5 or to the joint 3. Optionally, one of the pivot bearings 510 can support the pivot bar shaft 530. In this case, the locking device 511 can engage the locking nut 531 of the pivot bar shaft 530 and axially secure the pivot bar shaft 530. The locking device 511 can be designed as a locking screw, which also fixes the pivot position of the pivot bar 491 This can be implemented, for example, by clamping action or a circumferential locking in the locking nut 531. Alternatively, the locking device 511 can be designed as a mere locking bolt, in which case the pivot position of the pivot bar 491 is fixed in a different way, for example by a circumferential locking action at the shaft end 533 or at the shaft seat 534 and a counter locking action in the pivot bearing 510.

The elements 491-494 form the hip counter-bearing element 20. The telescopic bar 492 is displaceably mounted in the pivot bar 491 and is biased away from the unit by a spring element. By means of the rotating wheel 512, the telescopic bar 492 can be moved towards the unit against the spring force. In the process, the release lever 513 can engage stepwise in the manner of a ratchet on the locking rim 532 of the pivot bar shaft 530, thereby fixing the position of the telescopic bar 492. By operating the release lever 513, the engagement can be released and the telescopic bar 492 can then move away from the device under spring action. As a result, a pressing action of the hip counter-bearing element 20 in the sense of a hip overextension can be released and a person can be released freely.

The elements 491, 495-497 form the foot roller 22. For safety reasons, the foot roller 22 can only be provided on one side: hooking the feet on both sides could cause accidents, and this is avoided by design in the case of a half-sided design. Further alternative designs for the foot roller have already been explained above and can be applied here in the same way.

The pivot lever 495 is mounted on the pivot bar 491 so that it can be pivoted and moved. Two slide rails 436 and a locking section 540 can be provided on the pivot bar 491 for this purpose. A slide bearing 437, which supports the pivot lever 495, can slide along the slide rails 436 on the pivot bar 491. A locking bolt 538 can thereby selectively engage a locking of the locking section 540 and fix the displacement position of the pivot lever 495. The locking bolt 538 also forms an axis of rotation for the pivot lever 495 in the sliding bearing 437. A sliding bolt 561 may be guided in a mimic 560 to limit the pivoting movement of the pivot lever 495. A free lever end 562 may be tapered and received in a correspondingly shaped lever end receptacle 514, which may also be attached to the pivot bar 491 or the end of the slide rails 536. This also allows the pivot position of the pivot lever 495 to be fixed, which may be particularly advantageous in the seating configuration of the chair.

Optionally, only a strap or loop or the like may be provided instead of the foot roller 22.

The base 500 for the thigh pad 17 is attached to the thigh bar 16, and the thigh pad support 501 and rest 502 are attached to it. The thigh pad 17 is shown in FIGS. 49-52 for clarity.

The hip counter support element 20 may be folded over as a whole so that the cross bar 493 rests on the rest 502, with the pad 494 facing upward. To adjust the hip counter support pad 494, it may be mounted on a hip pad support 522 that is coupled to the cross bar 493 via a pivot bearing 523. The rotational position in the pivot bearing 523 may be fixable by means of a locking device 524. The thigh pad 17 (not shown here) extends only along the length of the thigh pad support 501. The hip counter support pad 494 and the thigh pad 17 can thus together form a seating surface. The rest 499 may be offset in height from the thigh pad support 498 so that 17 and 493 form a plane. This corresponds to the transverse division described above. This also allows for easy conversion of the chair to the sitting configuration (see, for example, FIGS. 9, 10, 19, 20, 35, 36). In the standing configuration shown, the shorter thigh pad 17 is advantageous because it then ends above the kneecap and does not interfere with the kneecap.

The upper intermediate joint 8 between the chest support 6 and the abdominal support 7 can be pivoted in at least two degrees of freedom: about the transverse axis and about the longitudinal axis of the rocker 9. The abdominal support 7 can be displaceable on the rocker 9. The leg rest 26 may be displaceable on the rocker 9, which for this purpose may be extended downward beyond the central joint 3 connecting the upper body section 1 and lower body section 2.

In this embodiment, the lower leg pad 19 is divided into an upper part and a lower part for each leg. The upper part can be pivoted relative to the lower leg bar 18, and the lower part can be displaced. The lower leg bar 18 may be telescopic in overall length or displaceable relative to the thigh bar 16 in the lower intermediate joint 13. The end joint 15 may include a bow slidable on the lower leg spar 18 and a pivot joint arranged distally on the bow.

In principle, all the joints described above can be locked. The locking can be frictionally engaged, for example, by pressing corresponding friction surfaces against each other. Locking can also be achieved by positive locking, for example by pressing correspondingly structured surfaces against each other. Such surfaces can, for example, have elevations and recesses, such as corresponding serrations or dents, which engage with one another. Alternatively, a locking element can engage recesses formed on both sides of the joint for positive locking. A simple example of this is a socket with a through hole and a perforated ring or disc segment running past the socket, in which, depending on the pivoted position of the joint, the through hole is aligned with one of the holes in the ring or disc segment so that a pin can be passed through them. A wide variety of forms of such locking joints are known to the skilled person, for example from the field of office chairs, training equipment or treatment chairs/couch beds.

The invention is limited only by the attached claims, but not by other details described in the embodiments. Details described in one embodiment may be used in other embodiments even if they are not described in detail therein. Similarly, details may be omitted unless they are absolutely necessary to achieve the features defined in the independent patent claims. For example, a central joint 3 may be omitted if only the upper body section 1 and the lower body section 2 are arranged in a position relative to each other in which their bearing surfaces impart the desired hyperextension of the hip joint to a person lying in a prone position thereon. Similarly, other joints such as the intermediate joints 8, 13, the end joint 15 and the base pivot joint 5 can be replaced by a rigid connection. All of the adjustment options described are optional.

When using the chair according to the invention, it is advantageous to ensure that stretching postures, in particular overextension of the hip joint, are within the non-pathological range, i.e. within the normal range of motion of the respective joint. This non-pathological range of over-extension of the hip joint is, of course, dependent on the training status of the individual. While the neutral-zero method used in the expert field usually specifies a maximum overextension of 15° for a normal range of motion, much higher values can be achieved in an appropriately trained individual, as can be observed in gymnasts and performers.

The chair according to the invention is a completely new concept and is capable of accommodating a person's body in a prone position, counteracting a shortening of the hip flexor muscles with associated tendons, ligaments and fasciae, and allowing further positions to be taken for further stretching and/or relieving positions. The chair can be used both in the living area and in the working area for different working environments such as office, workshop, monitoring areas, vehicles, assembly, laboratory or medical, physiotherapeutic or surgical activities for both laymen and the treating doctor or therapist as well as for the patient. It can be adjusted for standing, usually sitting, bending forward, squatting, kneeling and lying postures.

By incorporating the pressure units 141 according to the invention with the corresponding modules, holders, etc., a significant increase in the stretching effect and effective relaxation can be achieved, and additional therapeutic effects can be obtained.

The features included in the above-described embodiments are, for the most part, optional and interchangeable. The invention is defined by the respective applicable independent claims. Advantageous further developments and embodiments defined in the subclaims may constitute further independent inventions. Each feature described above, alone or in combination with other features, may constitute an independent invention, both in specifically described and in combinations and sub-combinations not specifically described.

For example, all or selected ones of the pressure units 141 may or may not be provided on all of the embodiments, variants, and variations of a chair according to the invention shown in the figures and described above.

Wherever a joint is described in one embodiment, variant, or variation, that joint may be omitted if necessary and may take any form described in another embodiment, variant, or variation.

In all embodiments, variants or variations, all features of embodiments, variants or variations from which they are based must also be applied, even if it is not specifically described, unless such application would be specifically excluded, modified or obviously not possible.

Also, any additions or extensions, options or alternatives, described in an embodiment, variant or variation, may be applied individually or in any combination or sub-combination in the same or another embodiment, variant or variation, as long as it does not leave the realm of the technically reasonable or possible, and the objects thus obtained may in turn form independent inventions.

Reference symbol list

| | | | |
|---|---|---|---|
| 1 | upper body section | 151 | clamping element |
| 2 | lower body section | 152 | holder |
| 3 | central joint | 153 | counter-pressure flap |
| 4 | standing base | 160 | head module |
| 5 | base pivot joint | 161 | bow |
| 6 | chest support | 162 | forehead pad |
| 7 | abdominal support | 163 | neck pad |
| 8 | upper intermediate joint | 164 | attachment |
| 9 | rocker | 165 | spring and extension mechanism |
| 10 | leg part | 166 | pivoting-sliding mechanism |
| 11 | thigh support | 181 | heel stop or heel pad |
| 12 | lower leg support | 182 | toe stop |
| 13 | Lower intermediate joint | 183 | instep hold-down device |

-continued

Reference symbol list

| | | | |
|---|---|---|---|
| 14 | foot support | 185 | spring mechanism |
| 15 | end joint | 186 | adjustment mechanism |
| 16 | thigh bar | 201 | seat surface |
| 17 | thigh pad | 202 | seat surface extension |
| 18 | lower leg bar | 203 | backrest |
| 19 | lower leg pad | 204, 205 | seat surface halves |
| 20 | hip counter-bearing element | 206 | recesses |
| 22 | Foot roller | 207 | bearing element |
| 23 | back support | 210 | extension |
| 24 | knee rest | 341 | arm support |
| 25 | foot rest | 342 | arm rest |
| 26 | leg rest | 343 | folding/pivoting mechanism |
| 27 | rest extension | 351 | first base pivot joint |
| 30 | single joint | 352 | second base pivot joint |
| 31 | sternum strut or sternum bearing | 353 | first strut |
| 32 | side wings | 354 | second strut |
| 33 | rib shell | 355 | telescoping bar |
| 34 | abdominal region | 356 | supporting joint |
| 36 | base frame 36 | 357 | auxiliary strut |
| 37 | sleeve | 358 | auxiliary rocker |
| 38 | gas cylinder | 359 | joint |
| 39 | piston | 361 | head rest |
| 51 | hold-down device | 371 | folding mechanism |
| 61 | knee support | 381 | print head |
| 131 | frame | 382 | base |
| 140 | print element | 383 | spring mechanism |
| 141 | pressure unit | 384 | abutment |
| 141a | pressure unit for pressure point a | 385 | spring |
| 141b | pressure unit for pressure point b | 386 | folding mechanism |
| 142 | neck antennas | 387 | thread |
| 143 | insert | 401 | screw clamp |
| 144 | hip bow | 410 | shoulder module |
| 145 | sleeve | 430 | chair element |
| 431 | screw clamp | 510 | pivot bearing |
| 436 | slide rails | 511 | locking device |
| 437 | slide bearing | 512 | rotating wheel |
| 440 | seating furniture | 513 | release lever |
| 441 | hook-in device | 514 | lever end receptacle |
| 442 | tilt safety device | 519 | chair roll |
| 460 | spine/shoulder module | 520 | swivel bearing |
| 461 | nubs | 521 | locking bolt |
| 470 | crotch stool | 522 | hip pad support |
| 490 | attachment part | 523 | pivot bear |
| 491 | pivot bar | 524 | locking device |
| 492 | telescopic bar | 530 | Pivot bar shaft |
| 493 | cross bar | 531 | locking nut |
| 494 | hip counter support pad | 532 | locking rim |
| 495 | pivot lever | 533 | shaft end |
| 496 | cross bar | 534 | shaft seat |
| 497 | foot pad | 536 | slide rails |
| 498 | thigh pad support | 537 | sliding bearing |
| 499 | rest | 538 | locking bolt |
| 500 | base | 540 | locking section |
| 501 | thigh pad support | 560 | Mimic |
| 502 | rest | 561 | sliding bolt |
| 503 | height adjustment | 562 | lever end |

The invention claimed is:

1. A device for treating muscles of a person, comprising an upper body section (1) connected to a lower body section (2) via a central joint (3), wherein the upper body section (1) and the lower body section (2) are movable relative to each other to cause an overstretching posture of a hip joint of the person to a predetermined overstretching angle, wherein the device further comprises a counter-bearing element (20) spaced relative to the central joint (3), wherein the lower body section (2) is divided into a thigh support (11) and a lower leg support (12), with a lower intermediate joint (13) connected between the thigh support (11) and the lower leg support (12), and wherein, above the counter-bearing element (20), a back support (23), a foot roll (22) and, below the lower intermediate joint (13), a knee pad (24) are provided.

2. The device according to claim 1, wherein the device is configured to treat hip muscles of the person.

3. The device according to claim 1, wherein a distance of the counter-bearing element (20) from the central joint (3) is adjustable and fixable.

4. The device according to claim 3, wherein the counter-bearing element (20) is also movable to a position relative to the upper body section (1) for use as a headrest.

5. The device according to claim 1, wherein the upper body section (1) has a chest support (6) and an abdominal support (7), which are connected to each other via an upper intermediate joint (8).

6. The device according to claim 1, further comprising a footrest (14) adjoined to the lower body section (2), which is connected to the lower body section via an end joint (15).

7. The device according to claim 6, wherein the footrest has an upwardly adjustable toe stop (182) and a hold down device (183).

8. The device according to claim 1, wherein the back support (23) is spaced at a distance from the central joint (3).

9. The device according to claim 1, wherein, in the area of the central joint (3), a leg rest (26) is provided.

10. The device according to claim 9, wherein the leg rest (26) has a rest extension (27).

11. The device according to claim 1, wherein the lower body section (2) has two leg parts (10) and the central joint (3) has two individual joints (30), where each individual joint (30) allows a swivel of a leg part (10) of the lower body section (2) relative to the upper body section (1) around a transverse axis.

12. The device according to claim 1, wherein the upper body section (1) is telescopically connected to the central joint (3) via a rocker (9).

13. The device according to claim 1, further comprising a head module (160) for holding a head of the person using the device.

14. The device according to claim 13, further comprising pressure units (141) at predetermined points of a contact surface of the device, for exerting local or punctual pressure at certain pressure locations on a body.

* * * * *